(12) United States Patent
Devine et al.

(10) Patent No.: US 8,611,594 B2
(45) Date of Patent: Dec. 17, 2013

(54) DYNAMIC DISPLAY OF VIRTUAL CONTENT ON SEVERAL DEVICES USING REFERENCE TAGS

(75) Inventors: Graeme Devine, Santa Cruz, CA (US); Jeff Ruediger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 12/879,801

(22) Filed: Sep. 10, 2010

(65) Prior Publication Data

US 2012/0064971 A1    Mar. 15, 2012

(51) Int. Cl.
*G06K 9/00* (2006.01)

(52) U.S. Cl.
USPC .............................. 382/103; 382/287; 715/757

(58) Field of Classification Search
USPC .......... 382/103, 284, 287; 715/733, 740, 757; 345/632, 633
See application file for complete search history.

(56) References Cited

U.S. PATENT DOCUMENTS

| | | | |
|---|---|---|---|
| 6,594,600 B1 | 7/2003 | Arnoul et al. | 702/94 |
| 2002/0102966 A1 | 8/2002 | Lev et al. | 455/412 |
| 2004/0183926 A1* | 9/2004 | Fukuda et al. | 348/239 |
| 2005/0162523 A1 | 7/2005 | Darrell et al. | 348/211.2 |
| 2009/0195538 A1* | 8/2009 | Ryu et al. | 345/419 |
| 2009/0316951 A1 | 12/2009 | Soderstrom | 382/103 |
| 2011/0090343 A1* | 4/2011 | Alt et al. | 348/164 |
| 2011/0242134 A1* | 10/2011 | Miller et al. | 345/633 |

* cited by examiner

*Primary Examiner* — Andrew W Johns
(74) *Attorney, Agent, or Firm* — Kenyon & Kenyon LLP

(57) ABSTRACT

This is directed to determining the relative position of several devices by capturing representations of the device environments in which a tag is located. The devices can compare the captured representations to determine a perspective of the tag corresponding to each device. In some cases, a device can determine an absolute position relative to a coordinate system integrated in a tag. Using the positioning information, several devices can receive directions to come together at a particular meeting point. In some cases, several devices can operate an application that requires the interaction of several users of the devices (e.g., multi-player games). The application can control the time or manner in which inputs are provided based on the relative positions of the devices. In some cases, the devices can display virtual content that is shared across several devices, where the different devices can each interact with the virtual content.

10 Claims, 16 Drawing Sheets

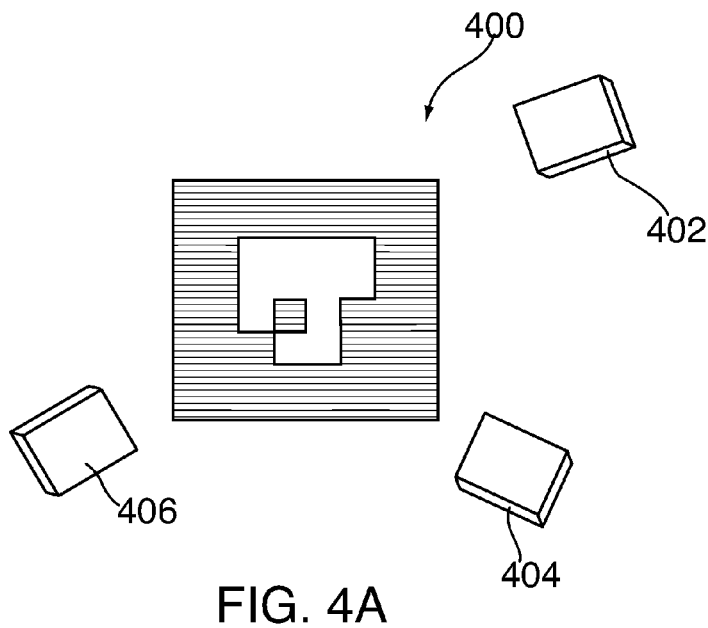
FIG. 4A
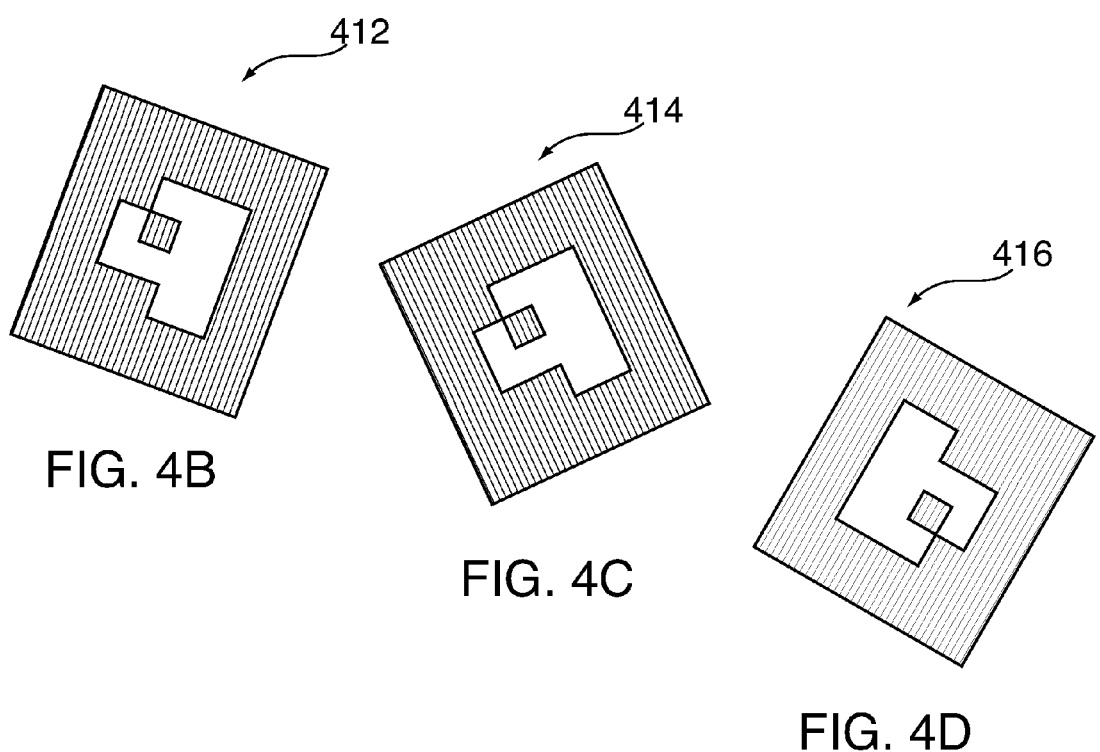
FIG. 4B
FIG. 4C
FIG. 4D

DYNAMIC DISPLAY OF VIRTUAL CONTENT ON SEVERAL DEVICES USING REFERENCE TAGS

BACKGROUND

As electronic devices have become smaller, and their functionality has increased, many users find themselves in possession of a device having communications circuitry for sending or receiving data from remote sources or other devices. In particular, many users own and carry portable electronic devices having communications circuitry that can be used to connect to a communications network through which devices owned by different users can share information.

Several connected devices can share information in many different contexts. For example, several devices can share contact information, communications (e.g., e-mail messages), application data, or other information to be used independently by each of the several devices. As another example, several devices can share common data used by a same application or process operating on each of the devices. In particular, several users can play a game together by sharing game information between the electronic devices.

Some processes or applications operating cooperatively between several devices may require different devices to provide information in a specific order. For example, some games (e.g., card games, battleship, or other board games) may be played by allowing each user, in a specific order, to play cards from the user's hand. Different approaches can be used to ensure that devices provide information in a correct order. For example, the users of the devices can coordinate amongst themselves to provide information at a proper time. As another example, users can assign an order or sequence to each of the devices, such that devices only provide information when the sequence allows them to do so. These approaches, however, can create an additional burden on the users.

In another context, users having electronic devices may be in a location where positioning circuitry is unavailable (e.g., a large conference room or a concert hall), and may wish to locate each other using the devices. To do so, the users may need to send various messages to each other (e.g., by e-mail, text message, or telephone calls) describing where they are, what they see, and try to guess where other users are to establish a suitable meeting point. This process can be time consuming and inaccurate. In addition, in noisy environments, voice communications between users can be further impeded.

SUMMARY

This is directed to determining the relative position of several devices based on images of a tag captured by each of the several devices. In particular, this is directed to monitoring images of a tag captured by different devices, sharing the captured images, and determining the relative positions of each device based on the shared images.

To determine the relative position of several devices, each device can capture an image of a same tag. Any suitable object can serve as a tag of which an image is captured. In particular, any object for which two images captured from different perspectives are always different can be used as a tag (e.g., an asymmetrical object). The tag can be provided using different approaches. In some embodiments, one or more users can provide the tag, for example by placing a card having an appropriate pattern on a playing surface. In some cases, users can instead or in addition capture an image of an object in the users' environment, or of a region of the users' environment. In such cases, any object in a user's vicinity can serve as a tag. In some embodiments, a location or site visited by users can provide one or more tags visible from most or all of locations within the site such that users can capture images of the tags and determine their positions relative to the tags from anywhere on site. For example, a concert location can display a single tag above the stage.

To improve the ability of individual devices to determine their positions relative to a tag, the tag can be known to the devices. In particular, each device can have a library of known tags to which the device can compare a captured image. In some cases, a tag can include a code (e.g., an embedded bar code) that can be used to identify the particular tag or provide attributes of the particular tab (e.g., characteristic dimensions or GPS coordinates). When the tag is known, a device can determine its position relative to the tag, and can share the determined position with other devices. This can reduce the amount of processing required by one or more devices to determine the relative position of all of the devices.

In some cases, a tag may not be known to one or more devices. For example, when the tag is selected as an object in the users' environment, the devices may not know the shape and dimensions of the object. To determine the relative positions of each device, the devices can capture images of the tag, and share the captured images with other devices. By comparing and analyzing the images, the devices can construct the shape and dimensions (or other attributes) of the tag, and from the constructed attributes of the tag, determine the relative positions of each device.

In some embodiments, each electronic device can indicate to its user the relative position of other devices having captured images of the same tag. For example, an electronic device can display a map or other representation of the user's environment in which the other detected devices are placed. The device can provide distance and angle information for each other device including, for example, a vector or directions for reaching the other device. In some embodiments, the directions can account for known features of the environment (e.g., walls and doors, roads, or other obstacles).

Electronic devices can determine their relative positions at any suitable time. In some cases, electronic devices can monitor the device's perspective of a tag (e.g., capture sequences of images of a tag), and provide changes in the perspective or position to other devices. Alternatively, each electronic device can determine its position relative to a tag at different intervals (e.g., pre-established or arbitrary intervals), in response to detecting device movement (e.g., based on the output of a motion sensing component), in response to receiving a user instruction, or combinations of these.

Once the relative position of each device has been determined, the devices can share information or content used by applications operating on the devices. For example, several devices can share content related to a multi-player game application operating on each device. The determined positioning information can be used to control the game play, and the order in which different users provide content to other devices.

In some embodiments, several electronic devices can engage in a cooperative application where the relative position of each device is used as a factor or input in the cooperative application. For example, several electronic devices can display a virtual avatar or other virtual content, where each device displays the avatar from a different perspective based on the position of the device relative to a tag. As a device moves, the displayed perspective of the avatar can change.

Users of each device can interact with displayed content using different approaches. For example, a user can provide an input on a device to displace or move the content. To ensure that all of the other devices see the interaction of the user with the content, the electronic device of the user can broadcast the user's interactions to the other devices. In some cases, several users can simultaneously or sequentially interact with displayed content, for example as part of a game. For example, several users can interact with one or more displayed avatars that fight each other in a game.

The particular content displayed by each device can be provided using different approaches. In some embodiments, a host device can serve as a game provider, and can provide information to each device describing the commonly displayed content. For example, a larger portable device (e.g., a notebook or tablet computer), or a fixed device (e.g., a desktop computer or a server) can generate content that is transmitted to the different devices. When different devices interact with the content, the devices can transmit their interactions or received user instructions to the host device, which can in turn adjust the manner in which the content is displayed, and provide the adjustments to the different devices. In some embodiments, each device interacting with the displayed content can instead or in addition provide the interactions or instructions directly to other devices displaying the content.

The host device can provide the content to be displayed by each device using any suitable approach. In some embodiments, the host device can determine the particular view of the content that each device will display, and provide individualized perspectives of the content to each device. When a particular device interacts with the content, the device can provide information describing the interaction to the host device so that the host device can send revised perspectives of the content to the users. Similarly, if a device changes position relative to the content (e.g., relative to a tag), the host device can generate a new perspective for the device. Alternatively, the host device can provide definition information defining the content from some or all perspectives or sides. For example, the host device can provide definition information for all perspectives, or for perspectives corresponding a particular range of device positions (e.g., within an arc region) of the initial position of the device relative to the content. When a device changes positions relative to the content, the device can revise the displayed perspective of the content based on the definition file. When a user of a device interacts with the content, the device can determine how the content will change based on the definition file, and provide information describing the interaction to other devices displaying the content so that all devices and adjust the display.

In some embodiments, several devices can provide content to be displayed simultaneously by some or all of the devices. For example, several devices on a same team can display shared content. As another example, several devices playing in opposition can each provide opposing content to be displayed (e.g., two players provide opposing avatars that fight each other). Users of one or more devices, including of devices that did not provide the displayed content, can interact with the displayed content.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 4A is a schematic view of several electronic devices placed around a tag in accordance with one embodiment of the invention.

FIGS. 4B-D are schematic views of the perspectives of the devices of FIG. 4A of the tag in accordance with some embodiments of the invention;

DETAILED DESCRIPTION

Figure 1:
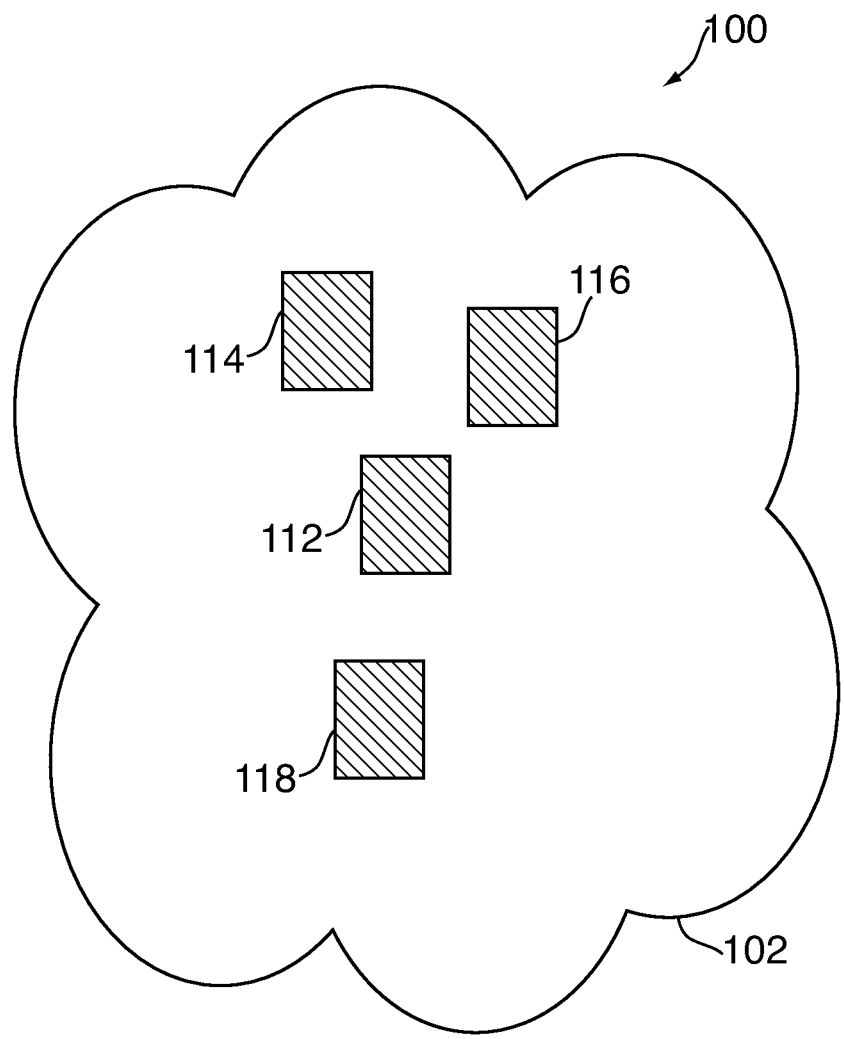
FIG. 1 is a schematic view of an illustrative system of electronic devices connected to a communications network in accordance with one embodiment of the invention.

Several electronic devices can be connected to a communications network. In particular, each electronic device can include communications circuitry for connecting to one or more communications networks. FIG. 1 is a schematic view of an illustrative system of electronic devices connected to a communications network in accordance with one embodiment of the invention. System 100 can include electronic devices 112, 114, 116 and 118 connected to communications network 102. Although system 100 only shows four devices, it will be understood that any suitable number of devices can be provided in system 100. In addition, the devices of system 100 can have the same or different attributes. For example, electronic devices 112, 114, 116 and 118 can be the same or different types of devices (e.g., cellular telephones and portable media players). Each of the devices can be associated with one or more users. In one implementation, different users can operate each of the devices of system 100.

Some or all of the devices of system 100 can be connected to each other to form a network over which information can be shared. Alternatively, some or all of the devices can be connected to an existing communications network that can provide communications paths that the devices can use to share information. The devices can share information using different approaches including, for example, using one or more applications operating on each of the devices. In some embodiments, a same application can operate on each of the devices, where the application includes calls to communications circuitry to provide application data or other information related to the proper operation of the application from one device to the other devices using the same application.

The devices can connect to network 102 using any suitable approach. In some embodiments, each device can connect directly to the communications network (e.g., via communications circuitry connected to an access point for the communications network). Alternatively, each device can connect to network 102 via an intermediary device (e.g., connect to the communications network by connecting to a device having an access point for the communications network).

Communications network 102 can support any suitable communications protocol, and include any suitable type of communications network (e.g., wired or wireless). For example, communications network 102 can support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 1GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof.

In some embodiments, it may be desirable for different electronic devices sharing information to know their position relative to other electronic devices. In particular, some applications used by the devices to share information may require or request positioning information for the devices. For example, a game application may need to identify an order in which users can play, where the order is determined from the position of the users (e.g., clockwise starting with a dealer). As another example, an application may need to know the relative position of other devices to provide directions or other information for guiding a user towards another device.

Figure 2:
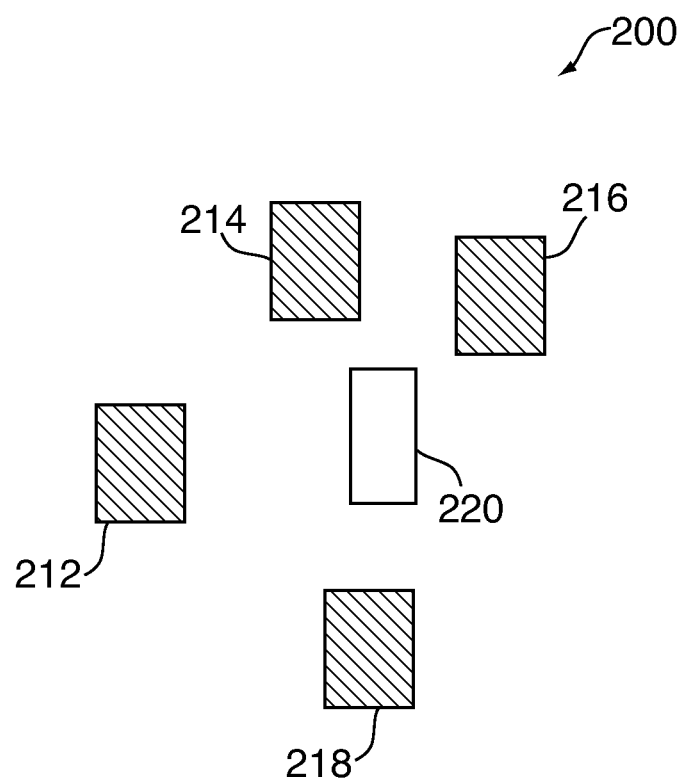
FIG. 2 is a schematic view of several devices positioned around a tag in accordance with one embodiment of the invention.

The electronic devices can use any suitable approach to determine their positions relative to one another. In some embodiments, the electronic devices can compare images captured of a unique by each device. FIG. 2 is a schematic view of several devices positioned around a tag in accordance with one embodiment of the invention. System 200 can include electronic devices 212, 214, 216, and 218, which can include some or all of the features or attributes of corresponding devices of system 100 (FIG. 1). The devices of system 200 can be in communication with each other such that they can share information or content that they each detect or receive.

To determine the relative positions of each of the devices, the devices can capture images of tag 220, for which each perspective is unique. In other words, a device can determine its orientation relative to a tag based on the particular appearance of the tag to the device.

The devices of system 200 can capture images of tag 220 at any suitable time. In some embodiments, the devices can be oriented towards tag 220 such that an appropriate sensor can receive information corresponding to the tag. For example, a camera of a device can capture an image of the device environment in which the tag is located. Users can orient the devices towards tag 220 at any suitable time. For example, all of the users can orient devices towards tag 220 at a same or overlapping moment in time (e.g., when an application requiring positioning information is operated by each of the devices). As another example, users can orient devices towards tag 220 at different moments in time (e.g., when it is a user's turn to play a game, or when a user moves his device relative to another user's device).

Any suitable object that can be detected by a sensor of an electronic device can be used as a tag. In particular, the object used as a tag can be selected such that the appearance of the tag from any perspective is unique. For example, the object used as a tag can be asymmetrical. In some embodiments, a user can provide a particular tag for several devices. For example, a user can provide a card on which a unique pattern is displayed. As another example, a user can provide an electronic device on which a tag is displayed. As still another example, a user can place an object carried by the user (e.g., a pen, a wallet, keys, or bag) in front of device sensors. In some embodiments, a tag can instead or in addition be selected from objects in the environment of the devices. For example, one or more objects such as chairs, plants, room layouts, or users can serve as a tag. As another example, a room or location in which the devices are located can have a dedicated tag (e.g., a dedicated tag displayed over a stage in a concert hall).

Figure 3:
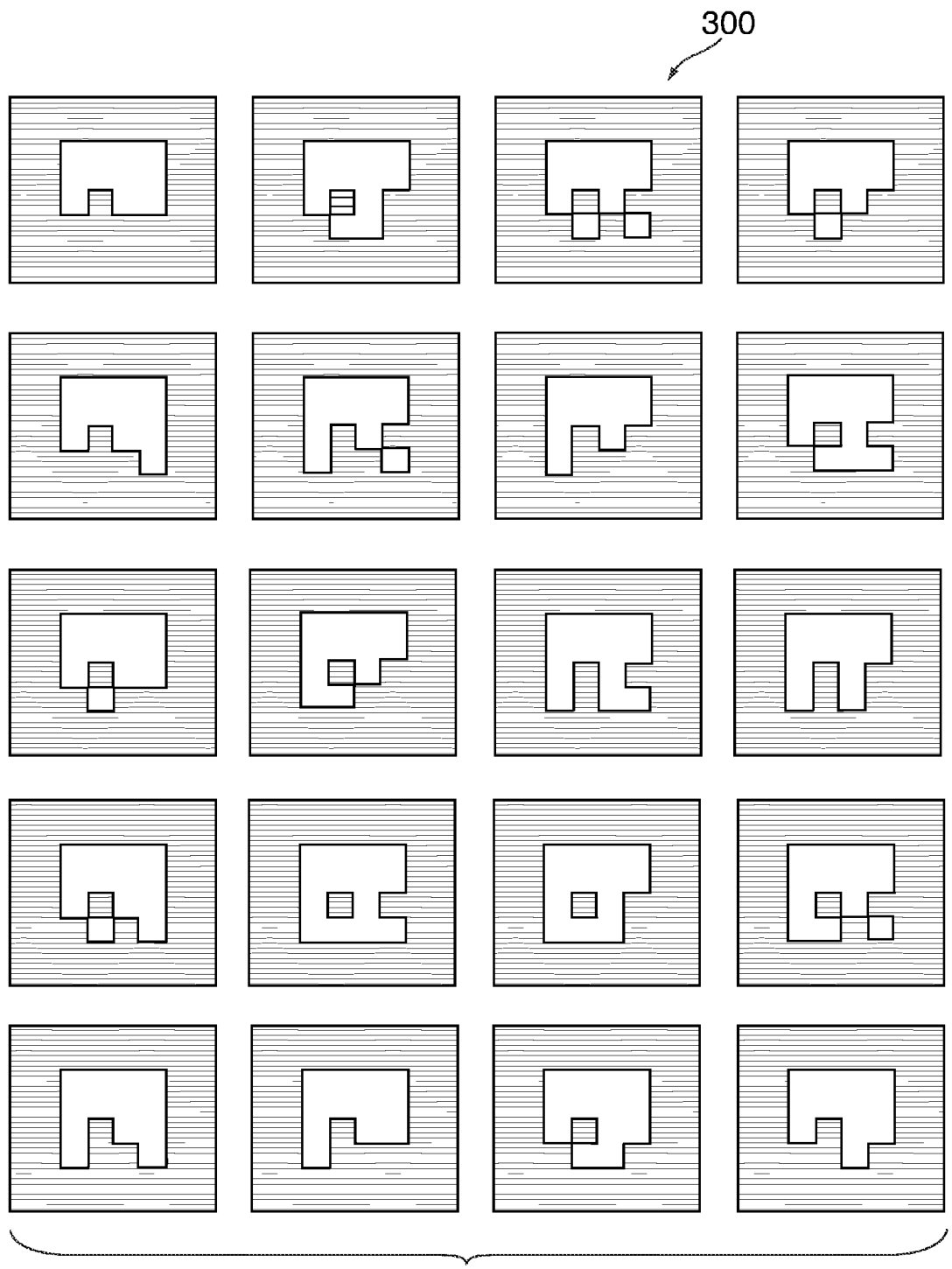
FIG. 3 is a schematic view of several illustrative tags in accordance with one embodiment of the invention.

A tag can have any suitable feature that makes the tag unique from different perspectives. FIG. 3 is a schematic view of several illustrative tags in accordance with one embodiment of the invention. Tags 300 can include one or more patterns of several colors (e.g., black and white) defined such that the pattern is asymmetrical. In some embodiments, several of the tags displayed in FIG. 3 can be combined to form a single tag. The patterns used in tags 300 can be constructed from any suitable combination of shapes. For example, the tags can be constructed by combining rectangular and square shapes of different colors and sizes. As another example, the tags can be constructed by combining other polygonal, curved, or arbitrary shapes (e.g., overlay several circular shapes). In some embodiments, the tags can instead or in addition include one or more linear elements distributed in a pattern providing an asymmetrical tag. Tags 300 can be provided using several different approaches including, for example, as physical tags or cards, as tags displayed by an electronic device display, or as a tag integrated in an environment (e.g., integrated on a table).

To determine the relative orientation of each device, users can orient an appropriate sensor (e.g., a camera lens) of the device towards a displayed tag and capture a representation of the tag using the sensor. For example, each device can capture an image of a tag from a particular perspective. FIG. 4A is a schematic view of several electronic devices placed around a tag in accordance with one embodiment of the invention. FIGS. 4B-D are schematic views of the perspectives of the devices of FIG. 4A of the tag in accordance with some embodiments of the invention. Devices 402, 404 and 406 can be disposed around tag 400 such that a sensor (e.g., a camera lens) of each device can capture a representation (e.g., an image) of tag 400 that is representative of the perspective of the device relative to the tag. In particular, device 402 can capture image 412, shown in FIG. 4B, of tag 400, device 404 can capture image 414, shown in FIG. 4C, of tag 400, and device 406 can capture image 416, shown in FIG. 4D, of tag 400. The particular images captured by each of devices 402, 404 and 406 can be unique, such that each represents only a single possible perspective of a device relative to tag 400.

Upon capturing an image of a tag, an electronic device can use any suitable approach to determine its position relative to other devices. In some embodiments, an electronic device can know the actual dimensions and shape or other attributes of a tag. For example, the electronic device can compare the captured image with a library of known tags. As another example, a tag can include an identifier or other reference indicating to a user one or more properties of the tag. The reference can include information describing features of the tag relative to a coordinate system. Alternatively, the electronic device can contact a remote tag server or other information source that relates to tags to retrieve information corresponding to the tag (e.g., retrieve a copy of the tag). When the tag is known, the electronic device can compare the known tag with the captured image of the tag, and determine the orientation of the device relative to the tag. For example, the electronic device can determine an angular measurement depicting an orientation of the device relative to a portion of the tag (e.g., a corner of the tag serves as an origin for a reference system). As another example, the electronic device can define a position, an orientation, or both in a two or three-dimensional reference system relative to the tag. For example, the electronic device can define a matrix providing positioning information for the device relative to the tag.

Once the electronic device has determined its position or orientation relative to the tag, the electronic device can provide the determined position or orientation information to other electronic devices positioned around the tag. For example, the electronic device can transmit a positioning matrix to other devices. As another example, the electronic device can instead or in addition receive positioning information from the other devices, and determine the relative positions of the devices (e.g., which device is to my left, to my right). In some embodiments, the electronic device can define a map on which all of the devices are positioned to allow a user to view the distribution of devices, confirm that the device has detected the correct distribution of other devices, or combinations of these. In some cases, one or several electronic devices can instead or in addition retrieve positioning information for the other devices, and define a data structure depicting the relative positions of all of the devices. For example, the one or several electronic devices can define a map, or define a circular buffer in which the individual devices are ordered based on the devices to the left and right of each individual device. The one or several devices can then transmit the data structure to the other devices so that all of the devices know their relative positions.

In some embodiments, one or more of the electronic devices may not know or have access to information describing the tag. For example, a device may not know the properties of one or more cards placed on a surface to serve as a tag. As another example, a device may not know the properties of an environment that is serving as a tag for the devices. In such cases, a device may not be able to single handedly determine its position or orientation relative to the tag. In particular, an electronic device may not be able to determine its distance from the tag (although its orientation relative to a reference frame of the tag may be detectable, if assumptions are made regarding the distribution of a reference frame on the tag). To determine the relative positions of several devices, each device can transmit a representation (e.g., an image) captured by a device sensor of the tag to the other devices. One or several devices can compare the different representations of the tag captured by the devices, and extract the different perspectives of the tag captured by each device. Using the extracted perspectives, the one or several electronic devices can determine the relative position of several devices. In some cases, the one or more electronic devices can determine exact positions for each of the devices relative to a reference frame (e.g., a reference frame corresponding to the tag). As described above, each electronic device can individually determine the relative positions of all of the electronic devices, or one or more devices can determine the positions of the devices and transmit a data structure or other information describing the determined positions.

Figure 5:
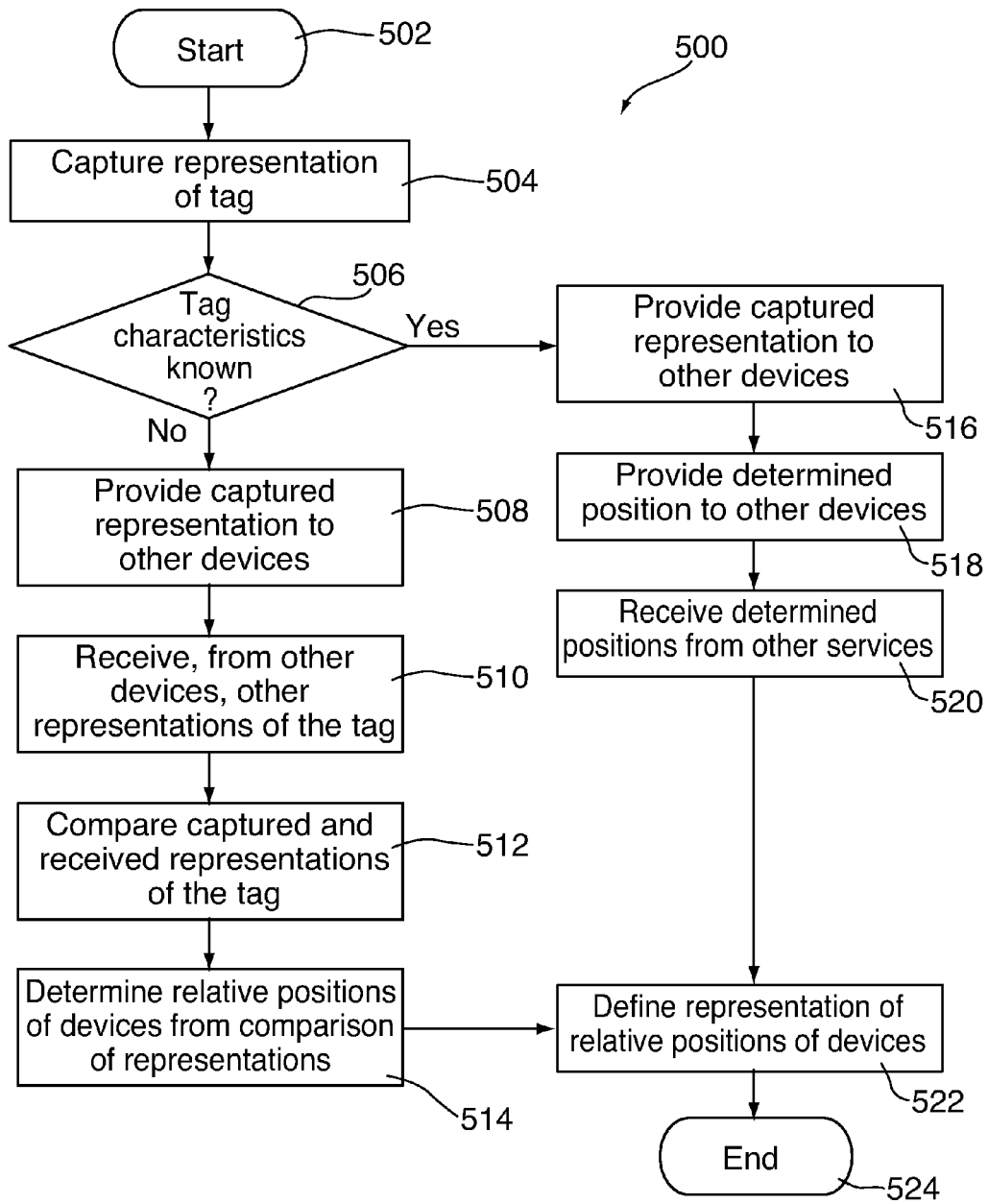
FIG. 5 is a flowchart of an illustrative process for determining the relative position of devices based on a captured representation of a tag in accordance with one embodiment of the invention.

FIG. 5 is a flowchart of an illustrative process for determining the relative position of devices based on a captured representation of a tag in accordance with one embodiment of the invention. Process 500 can begin at step 502. At step 504, the electronic device can capture a representation of a tag. For example, the electronic device can use one or more sensors (e.g., a camera) to capture a representation (e.g., an image) of a tag. At step 506, the electronic device can determine whether characteristics of the tag are known. For example, the electronic device can determine whether the tag is one of a library of known tags. As another example, the electronic device can determine whether the tag has embedded information describing the characteristics of the tag. The characteristics can include, for example, the size of tag or of tag elements, orientation information, a reference frame, or combinations of these. If the electronic device determines that tag characteristics are not known, process 500 can move to step 508.

At step 508, the electronic device can provide the captured representation to other devices. For example, the electronic device can transmit, over a communications network, the representation of the tag captured by the device to other devices having also captured representations of the tag. In particular, the electronic device can transmit the representation to other devices running a same application as the device (e.g., an application requiring the representation), or to devices requesting the representation. In some embodiments, the electronic device can broadcast the representation such that other devices needing the representation can receive it. At step 510, the electronic device can receive, from other devices within the communications network, other representations of the tag. For example, each of the other devices can individually capture representations of the tag corresponding to the position and orientation of the other devices relative to the tag, and can transmit the captured representations to the electronic device.

At step 512, the electronic device can compare the captured representation of the tag and the received representations of the tag. For example, the electronic device can compare the perspectives of the tag in each of the representations. As another example, the electronic device can identify particular features that are shared between the several perspectives (e.g., particular shapes that appear sheared or compressed in different representations). At step 514, the electronic device can determine the relative positions of the devices from the comparison of the representations. For example, the electronic device can determine, for each device, the perspective that each device has of the tag. Process 500 can then move to step 522.

Returning to step 508, if the electronic device instead determines that characteristics of the tag are known, process 500 can move to step 516. At step 516, the electronic device can determine the position of the device from the captured representation. For example, the electronic device can define the position, orientation, or both of a device in three-dimensional space relative to an origin incorporated in the tag. The position can be expressed using any suitable approach, including for example as a matrix. At step 518, the electronic device can provide the determined position to other devices. For example, the electronic device can transmit the position information to other devices within a communications network. At step 520, the electronic device can receive, from other devices, determined positions of the other devices relative to the same tag and reference frame. For example, the electronic device can receive a matrix defining the position of a device from each of the other devices. In some embodiments, the position information can be provided using different coordinate systems (e.g., a rectilinear system or a polar system). In such cases, the electronic device can convert one or more of the coordinate systems to a single system.

In some embodiments, an electronic device can receive from several different devices both captured representations and determined positions. The electronic device can then process the received information using both branches of process 500 to reach step 522. At step 522, the electronic device can define a representation of the relative positions of the devices. For example, the electronic device can define a graphical representation (e.g., a map) of the devices disposed around a tag. As another example, the electronic device can define a data structure (e.g., a list or stack) in which the relative positions of the devices are stored. The electronic device can, in some embodiments, provide the defined representation to the other devices. This may serve, for example, to ensure that all of the devices agree with the determined relative positions of the devices, or to ensure that all devices know the relative positions of the devices when only a single device determines the relative positions for all of the devices. In some cases, each device can define a representation for the relative positions of a subset of devices, and transmit the subset representation to other devices so that all of the devices can construct a complete representation from the defined subset representations. By distributing the processing load among devices, the devices can more rapidly establish a complete representation of the relative device positions. Process 500 can then end at step 524.

The electronic devices can revise or review the relative positioning of the devices at any suitable time. In some embodiments, the electronic devices can capture new representations of a tag at predefined intervals including, for example, based on time intervals, device operations (e.g., before or after it is a user's turn to play), or detected movement of the device. In particular, an electronic device can monitor the output of positioning components, motion detection components, or other components of the device to determine whether a device has moved enough to have possibly changed positions relative to another device. When an electronic device determines that it has moved more than a threshold amount, the electronic device can capture a revised representation (e.g., a revised image) of the tag.

The electronic device can determine, from the captured revised representation, whether the device has changed perspective relative to the tag by an amount such that the position of the device relative to other devices may have changed. For example, the electronic device can compare the captured revised representation and the representations previously captured by other devices to determine whether the captured revised representation corresponds to a perspective that changes the previously determined relative positioning of the devices. To reduce the processing required by the device, the device can, in some embodiments, initially compare the captured revised representations with the representations previously captured by devices determined to be positioned immediately adjacent to the device (e.g., devices to the left and right of the device). If the electronic device determines that the captured revised perspective corresponds to a position such that the devices previously adjacent to the device are no longer separated by the device, the electronic device can continue to compare the captured revised perspective to other perspectives previously captured by other devices to determine its new relative position (e.g., if the revised captured perspective is to the left of the perspective of the device previously to the left of the device, the electronic device can compare the revised captured perspective with the previously captured perspective of a device further to the left of the device).

In response to determining that the captured revised representation indicates that the relative position of the devices may have changed, the electronic device can provide the captured revised representation to other devices. For example, the electronic device can provide the captured revised representation to some or all of the devices that captured a representation of the tag (e.g., only to the devices that are likely to be affected by the change in position of the device). The devices can then re-establish the relative positions of the electronic devices.

In some embodiments, the electronic device can instead or in addition define a revised position from the revised captured image. For example, if properties of the tag are known, the electronic device can determine its revised position, and compare it with the previously known positions of other devices. If the electronic device determines that the revised position of the device changes the relative position of the electronic devices, the electronic device can transmit revised position information to other devices.

Figure 6:
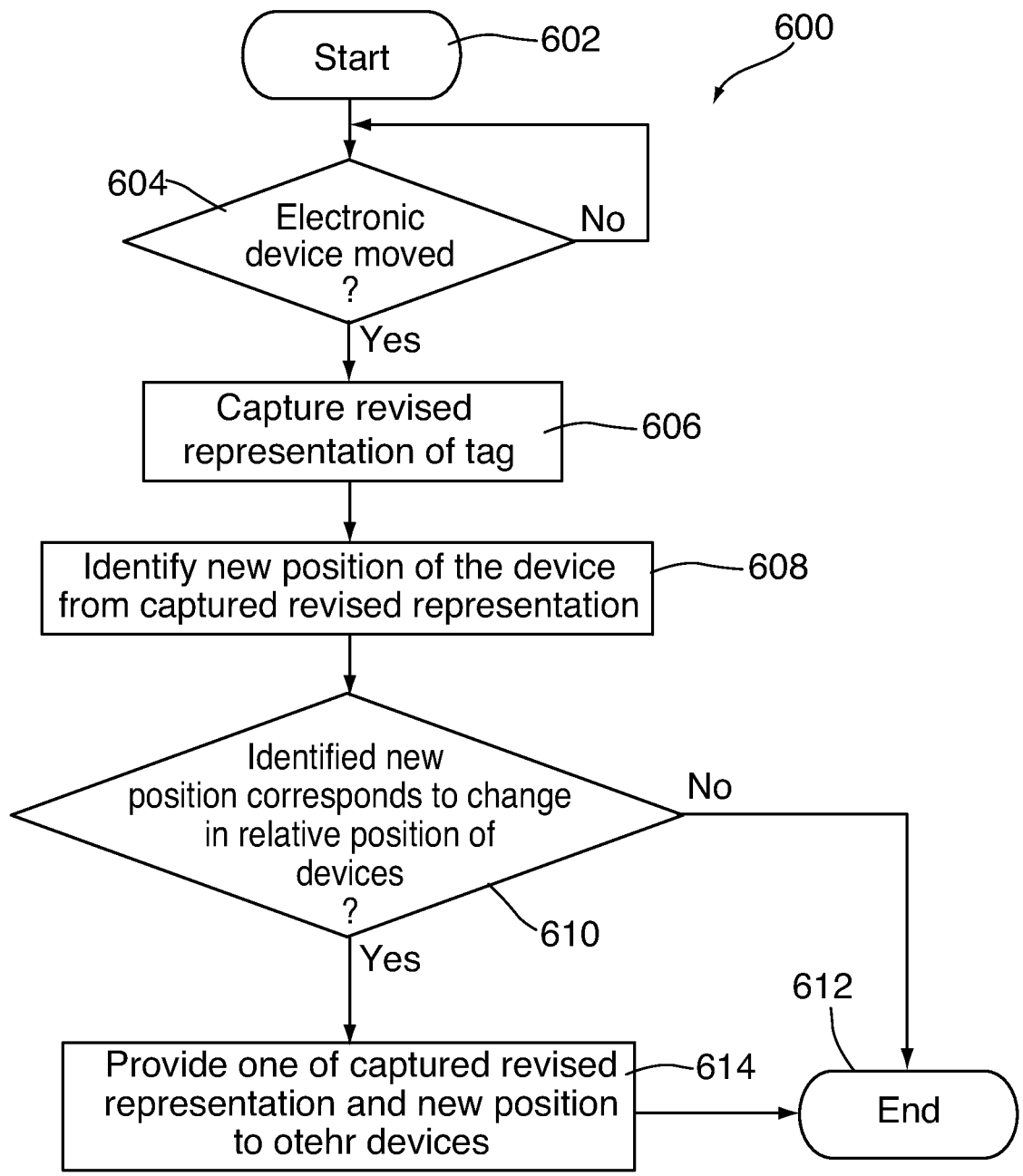
FIG. 6 is a flowchart of an illustrative process for determining whether the relative positions of electronic devices have changed.

FIG. 6 is a flowchart of an illustrative process for determining whether the relative positions of electronic devices have changed. Process 600 can begin at step 602. At step 604, the electronic device can determine whether movement of the electronic device was detected. For example, the electronic device can determine whether the output of positioning circuitry corresponds to a device movement that exceeds a particular threshold. As another example, the electronic device can determine, from the output of a motion detecting component (e.g., an accelerometer or gyroscope), whether the device moved more than a threshold amount. If no movement of the electronic device is detected, process 600 can return to step 604 and continue to monitor for device movement. If, at step 604, the electronic device instead determines that movement of the device was detected, process 600 can move to step 606.

At step 606, the electronic device can capture a revised representation of a tag using an appropriate sensor of the electronic device. For example, the electronic device can capture an image of the tag using a camera or other optical component. At step 608, the electronic device can identify a new position of the device from the captured revised representation. For example, the electronic device can determine positioning information corresponding to the revised representation based on attributes of the tag. As another example, the electronic device can determine positioning information of the device by comparing the captured representation with previously captured representations of the tag provided to the device by other devices. At step 610, the electronic device can determine whether the identified new position corresponds to a change in the relative positions of several electronic devices. For example, the electronic device can determine whether the new position corresponds to a new distribution of electronic devices around the tag (e.g., the electronic device has at least one new device immediately adjacent to the electronic device). If the electronic device determines that the identified new position does not correspond to a change in the relative positions of the devices, process 600 can move to step 612 and end.

If, at step 610, the electronic device instead determines that the identified new position corresponds to a change in the relative positions of the devices, process 600 can move to step 614. At step 614, the electronic device can provide at least one of the captured revised representation and the identified new position to other electronic devices. For example, the electronic device can transmit its captured revised representation so that all of the devices can revise the established map of relative device positions. As another example, the electronic device can transmit coordinates corresponding to its new position to other devices. Process 600 can then end at step 612.

Several electronic devices can perform any suitable task, or provide any suitable information for a user once the relative positions of the several devices have been established. In some embodiments, several electronic devices can be used to provide directions guiding the users of the several electronic devices together, or to provide directions for avoiding one or more of the users of the several electronic devices. This approach may be useful in cases where a device does not include positioning circuitry, when the positioning circuitry is unable to function (e.g., GPS circuitry when no connection can be made to a satellite), or when the positioning circuitry is not sufficiently accurate.

Figure 7:
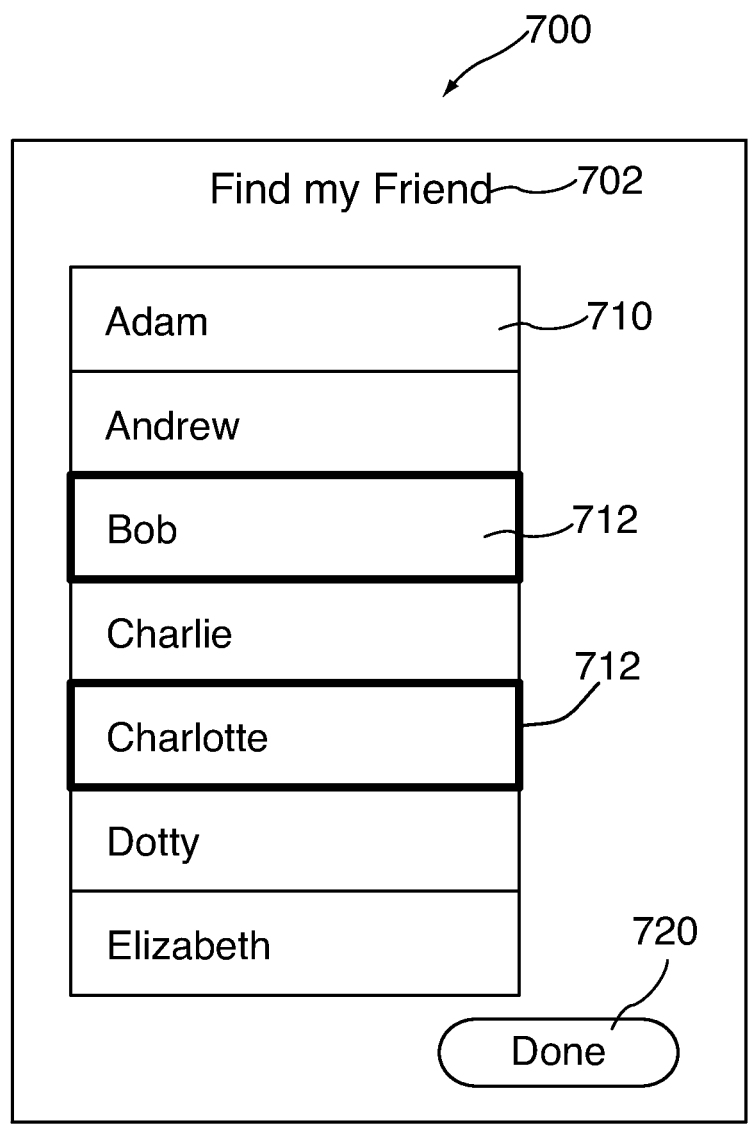
FIG. 7 is schematic view of an illustrative display of an application for finding a path to another electronic device in accordance with one embodiment of the invention.

A user can direct an electronic device to provide directions to find another electronic device using any suitable approach. In some embodiments, at least one of the electronic device and the other electronic device can operate a particular application that makes use of the relative positioning information. For example, an electronic device can operate an application for finding a friend. FIG. 7 is schematic view of an illustrative display of an application for finding a path to another electronic device in accordance with one embodiment of the invention. Display 700 can include title 702 indicating the particular type of display provided. In particular, title 702 can indicate that display 700 can be used to identify the location of one or more friends of the user. Display 700 can include listings 710 of users or friends known to the user of the device providing display 700. The particular items in listings 710 can be retrieved from any suitable source in the electronic device including, for example, from one or more items from a contact list of an address book, social networking account, or other sources of people known to the user.

A user can select one or more friends to find in listings 710. For example, the user can provide selections 712 of one or more of the individual listings. After having selected the particular friends that a user wishes to find, the user can select done option 720. This may indicate to the application or device that the identified friends should be identified. In response to receiving an instruction identifying the friends to find, the electronic device can provide an indication to the friends that the user wishes to find them. For example, the electronic device can provide a communication to one or more devices of the identified friends in which the device directs the one or more devices to capture a representation of a tag. In some embodiments, the communication can identify the particular tag of which to capture a representation. For example, the communication can provide GPS coordinates for the tag, or a description of the tag.

In some embodiments, the tag can be provided by a particular site (e.g., by a concert hall or convention center). The tag can then be well established for all users, and in some cases have a known shape, form, size, location (e.g., GPS coordinates), orientation (e.g., compass bearing), or other tag characteristics. In some cases, the tag can include an embedded code or other information integrated in the tag from which an electronic device can retrieve tag characteristics upon capturing a representation of the tag. To ensure that a user can determine his location from anywhere within a site, the site can include several tags disposed at appropriate locations. For example, a site can include several tags disposed in different areas of the site, such that a user located anywhere or almost anywhere on site will have a tag within his field of view. Each tag can include location information (e.g., GPS coordinates) such that several users capturing images of different tags can still determine their locations (absolute or relative to each other). In some cases, a tag can be provided as a three-dimensional object, such that the tag can be captured from any perspective (e.g., a cube or a pyramid). The particular portion of the tag that is captured can include embedded information describing the orientation of the captured portion or face of the tag.

In addition to directing the user's friends to capture representations of the tag, the electronic device can capture a representation of the tag. For example, the application can direct the user to orient the device in a particular orientation such that the device can capture a representation of the tag. Using the captured representation, and representations of the same tag captured by devices of the identified friends, the device can determine the relative positioning of the device and of the friends' devices. For example, the electronic device can use one or more of the approaches described above to determine the relative position of each of the devices.

Figure 8:
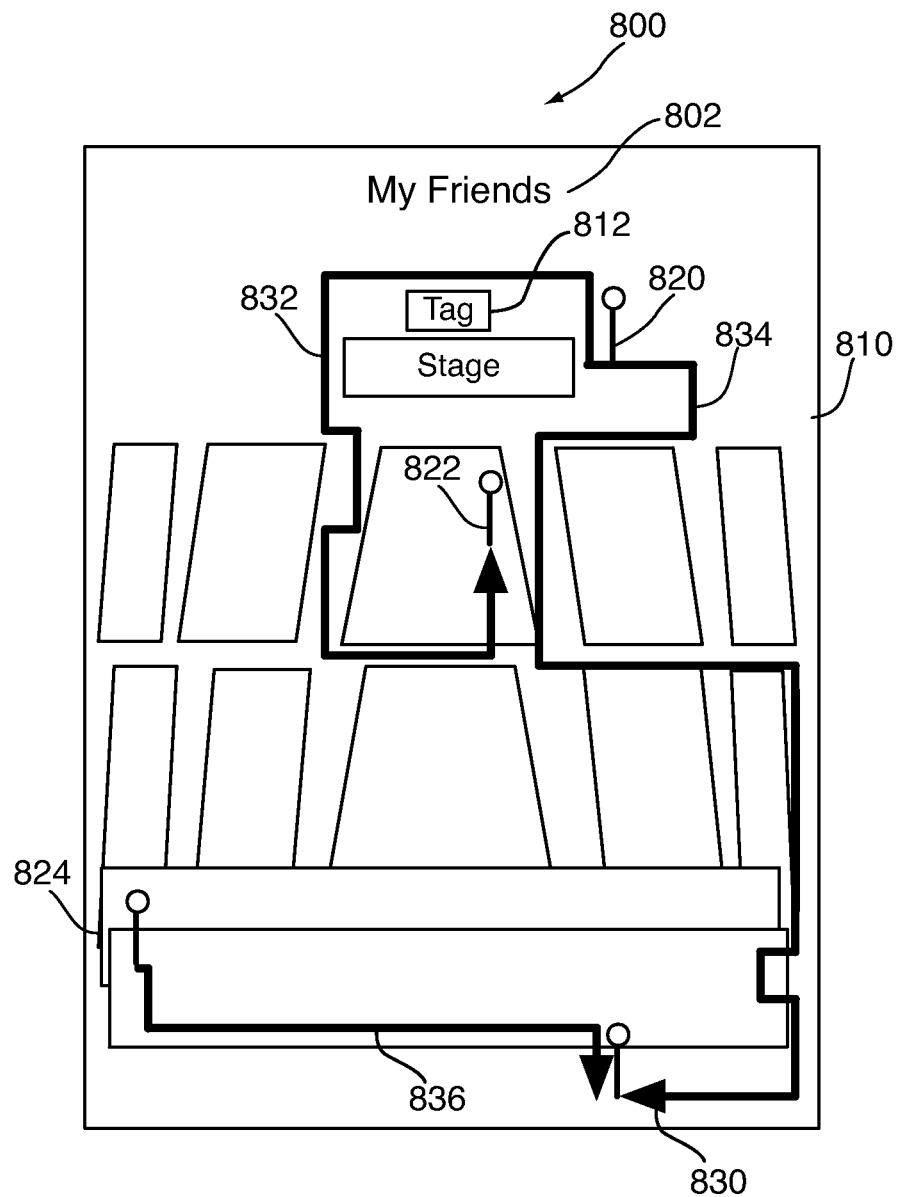
FIG. 8 is a schematic view of an illustrative display for indicating the positions of several devices in accordance with one embodiment of the invention.

The electronic device can display the relative positions of the devices using any suitable approach. In some embodiments, the electronic device can display a map on which pins or other objects are used to represent the different devices. FIG. 8 is a schematic view of an illustrative display for indicating the positions of several devices in accordance with one embodiment of the invention. Display 800 can include title 802 identifying the type of information provided by the device. For example, title 802 can indicate that the device is providing a display by which an electronic device provides directions to the devices of other users. Display 800 can include map 810 of a region in which the several devices are found. The map can include any suitable element to assist a user in orienting himself such as, for example, furniture, fixtures, objects, or other items that a user can see in the region or location of the devices. For example, in a concert hall, the map can include seating sections, a stage, and representations of several levels (e.g., an orchestra level and a balcony level). In some embodiments, a user can navigate within the map, for example by panning or scrolling the map, zooming in and out different regions of the map, or selecting displayed items in the map to view more detail or additional information. For example, the map can include a particular display that can be called up by a user, where the display provides a perspective of someone located at a particular location within the map. In some embodiments, a user can view different floors or levels on a map by selectively displaying each floor or level. In some embodiments, the map can include a three-dimensional representation of a space. In such cases, a user can navigate within the map, including for example navigate along different levels or floors of the map (e.g., navigate in x, y and z directions).

The devices of the user and the user's friends can be identified by individual markers. For example, marker 820 can identify the user's device, while markers 822 and 824 can identify each friend's device. The particular location of each of the user and the user's friend can be determined, as discussed above, from captured representations of tag 812 (e.g., located above the stage, where it is easily visible to all devices). The user can select one or more markers to call up information regarding the user associated with the marker including, for example, contact information, addressing information, location trail, social networking activity, or other information that may relate to the user. In some embodiments, the user can select a particular marker to provide a communication to the corresponding friend, or to direct an application of the user's device to interact with an application of the friend's device. For example, a user can select a marker to provide a communication directing a friend to meet the user at a particular location. As another example, a user can select a marker to direct a friend to open an application used to share recorded information (e.g., share a video of concert goers dancing to music, or a video of a band on stage).

Using the marked locations, a user can determine an appropriate path to go to the location of one of the user's friends. For example, a user can identify several landmarks around which a user will need to move to reach a friend. As another example, the user can direct the electronic device to define a path that the user can follow to reach his friend. The resulting path can be provided as a graphical representation on map 810, as a sequence of instructions, or as combinations of these. For example, path 832 can show a path that user must follow from marker 820 to marker 822 identifying a friend's location. The electronic device can use any suitable approach to identify the specific places where a user must turn or continue along to follow the defined path including, for example, direction based on landmarks or other identifiable objects, distances (e.g., in feet or number of steps), directions (e.g., compass directions), or combinations of these.

In some cases, a user can instead or in addition send a request to a friend to come to the user, or to meet the user at a meeting point. For example, the user can send a communication to another user inviting the user to come to his location (e.g., send a message indicating why the user's current location is better than the friend's location, and inviting the friend to join the user). As another example, the user can send a communication to a friend directing the friend to meet the user at a meeting location. The meeting location can be selected using any suitable approach including, for example, at or near a midpoint between the user and the friend, at a point on a path between the user and a friend, at a convenient location on the map (e.g., where the user and friend are planning to go next, in a more sparsely populated area to increase the chance that the user and friend meet, or in a location from which a representation of the tag is easily captured to assist in guiding the user and friend to each other). In some cases, the user or the friend can instead or in addition propose or define a meeting location, or negotiate together to define a meeting location. For example, the user can propose a meeting location identified by marker 830, which the user's friend can elect to accept or decline (and in turn propose an alternate meeting location).

Once the meeting location has been established (e.g., the user's location or a different meeting location), the electronic device can define a path for at least the user to follow to reach the meeting point. For example, the electronic device can define path 834 for the user to reach marker 830. In some embodiments, the electronic device can instead or in addition define a path from the user's friend to reach the meeting point (e.g., path 836 directing the friend of marker 824 to meeting location 830). The defined path can be transmitted to the user's friend using any suitable approach including, for example, as part of an application used to display a map or to determine a user's position based on a representation of a captured tag. Alternatively, the user can rely on the electronic device of the friend to establish a path to follow to reach the meeting location.

Figure 9:
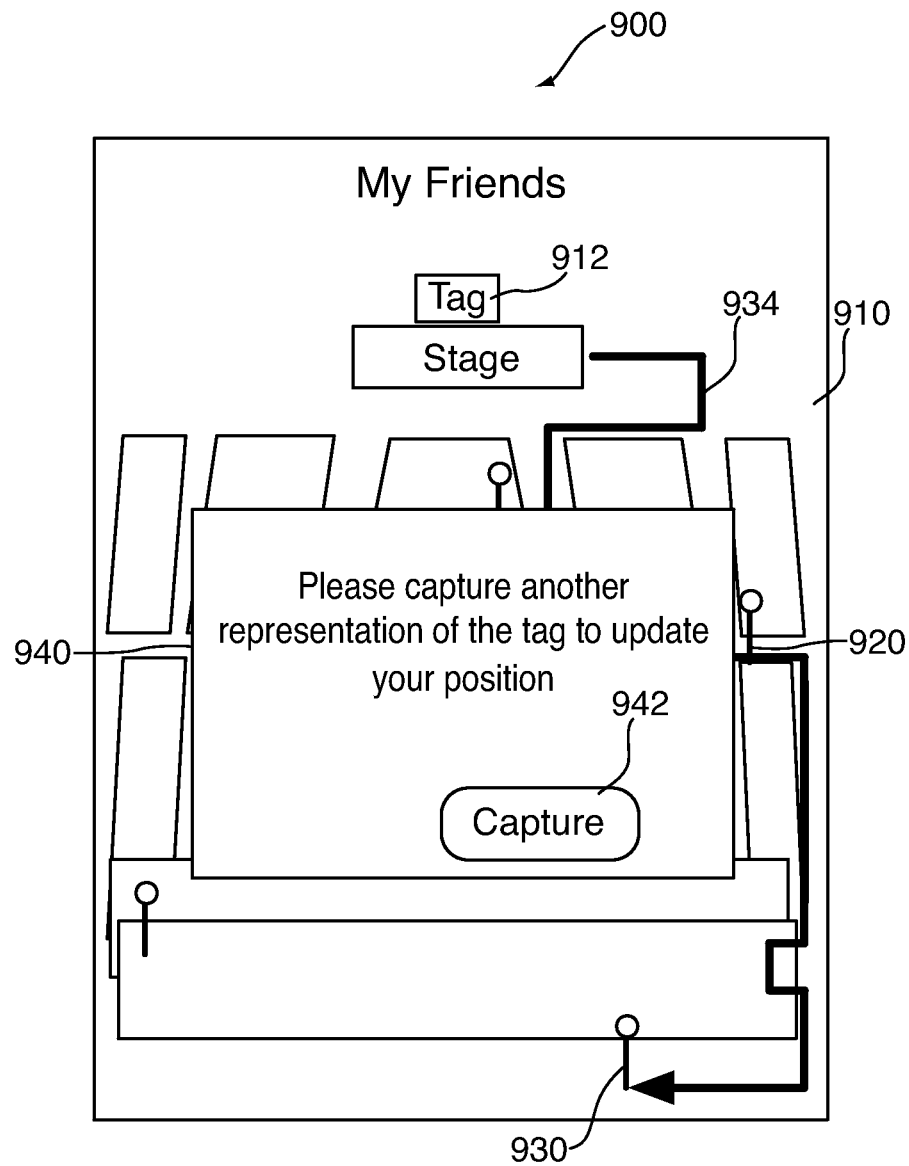
FIG. 9 is a schematic view of an illustrative display for prompting a user to capture a new representation of a tag in accordance with one embodiment of the invention.

To prevent a user from getting lost as the user travels to a meeting point, it may be desirable for the electronic device to update the user's position on the map, or to revise the path used by the user to reach the meeting location. To determine a user's new location, however, the electronic device may need a revised representation of the tag as captured from the user's new location. The electronic device can use any suitable approach for capturing new representations of the tag. In some embodiments, the electronic device can prompt the user to capture an image of a tag. The prompt can take any suitable form including, for example, a haptic or displayed indication. FIG. 9 is a schematic view of an illustrative display for prompting a user to capture a new representation of a tag in accordance with one embodiment of the invention. Display 900 can include some or all of the features of display 800 (FIG. 8) including, for example, map 910, tag 912, user marker 920, meeting location marker 930, and path 934, which can include some or all of the features of the corresponding elements of display 800. The electronic device can prompt a user to capture a new representation of a tag by displaying prompt 940, for example as a pop-up window. In some cases, other user interface elements can be used instead or in addition to prompt the user. The user can select capture option 942 to enable one or more sensors to capture a representation of tag 912. In some cases, a user may need to re-orient the device to align a sensor with the tag (e.g., point a camera of the device towards the tag). In response to receiving a selection of option 942, the electronic device can capture a representation, for example by providing a display corresponding to image capturing (e.g., display a camera application interface).

In response to capturing a new image of the tag, the electronic device can determine the user's new location, and revise the location or position of marker 920 on map 910. If the user is following the initial path (e.g., path 934) the electronic device can leave the path displayed as it is. If the user instead has veered off the path, the electronic device can define a new path for the user, and direct the user to follow the new path. The new path can be provided using any suitable approach including, for example, as a graphical representation on the map, as a listing of direction, or as a combination of these.

The electronic device can direct a user to capture new representations of the tag at any suitable interval. In some embodiments, the electronic device can define a time-based interval, and prompt a user to capture a revised tag representation when the interval has lapsed (e.g., every 3, 5 or 10 minutes). In some embodiments, the electronic device can instead or in addition monitor the movement of the device to predict or evaluate how far a user has moved since a representation of the tag was last captured. For example, the electronic device can monitor the output of a motion-sensing component (e.g., an accelerometer or a gyroscope) to determine how much the device has moved. In particular, the electronic device can monitor for an output corresponding to walking, running, or travelling in a vehicle. In some embodiments, the electronic device can instead or in addition prompt a user to capture a representation based on information captured by other sensors within the device. For example, the electronic device can determine that a new communications network (e.g., a new WiFi network) was discovered, that location information was received (e.g., information from GPS circuitry, or location derived from cellular tower triangulation), values of one or more proximity or infrared sensors match particular threshold, or any other sensor output matches a particular criteria indicative of possible device movement.

In some embodiments, the electronic device can instead or in addition automatically capture representations of the tag without requiring an explicit action from the user. In some cases, one or more sensors of the device (e.g., front and rear-facing cameras) can automatically capture representations of the environment of the device. The electronic device can monitor the captured representations, and determine whether one or more of the representations include the tag. If the tag is identified, the electronic device can then determine the position of the device relative to the tag. So long as the electronic device captures representations at suitable intervals (e.g., such that the time or distance between two captured representations does not exceed a maximum threshold), the electronic device can automatically revise the determined position of the device without needing to prompt the user.

The electronic device can attempt to capture representations of the tag at any suitable time. In some cases, the electronic device can continuously capture representations of the device environment in an effort to capture a representation of a tag (e.g., continuously while the corresponding application is operating, while the user is following directions, or when the user interacts with the device or application). In some cases, the electronic device can instead or in addition capture representations only at particular times. For example, the electronic device can capture representations of the user's environment at particular time intervals, in response to detecting particular sensor outputs, or combinations of these. In some embodiments, the electronic device can monitor one or more other sensors before directing the device to capture a representation of the device environment using an appropriate sensor. For example, the electronic device can monitor a proximity sensor or an ambient light sensor to determine whether the device is exposed to an environment, or confined in a closed space. For example, the electronic device can monitor the output of an ambient light sensor to determine whether the device is in a user's pocket, or in a user's hand. As another example, the electronic device can monitor a motion-sensing component, after having determined that the device is in the user's pocket, to determine whether the user has taken the device out of his pocket.

If the electronic device determines that no representation of the tag has been automatically captured for a particular duration (e.g., a time or event-based duration, as described above), the electronic device can prompt the user to capture a representation. The electronic device can use any suitable approach to prompt the user including, for example, providing a displayed prompt (e.g., as shown in display 900, FIG. 9), providing a haptic or tactile indication (e.g., causing the device to vibrate), providing an audio prompt, or any other prompt that the user can feel or detect.

In some embodiments, several devices can interact based on the relative position of the devices. For example, some applications can make use of the relative position of devices to inform the manner in which the applications perform. In some embodiments, applications provided on several devices can each receive instructions or interactions from their respective users. The interactions can be shared among the devices (e.g., as part of the applications) to allow the users to interact with the same content or information together. Some applications, however, can require user inputs to be provided in a specific order. For example, some game applications can be played by users providing inputs in a known sequence. In particular, card games can often require cards to be distributed to different users in a particular order, or can require users to play cards in a particular order. Alternatively, a game play can require users to pass cards or other game elements to specific users playing the game (e.g., challenge a particular user with your cards). To provide an enjoyable experience, it may be desirable for the devices to seamlessly control the game play based on the relative position of the devices.

Figure 10:
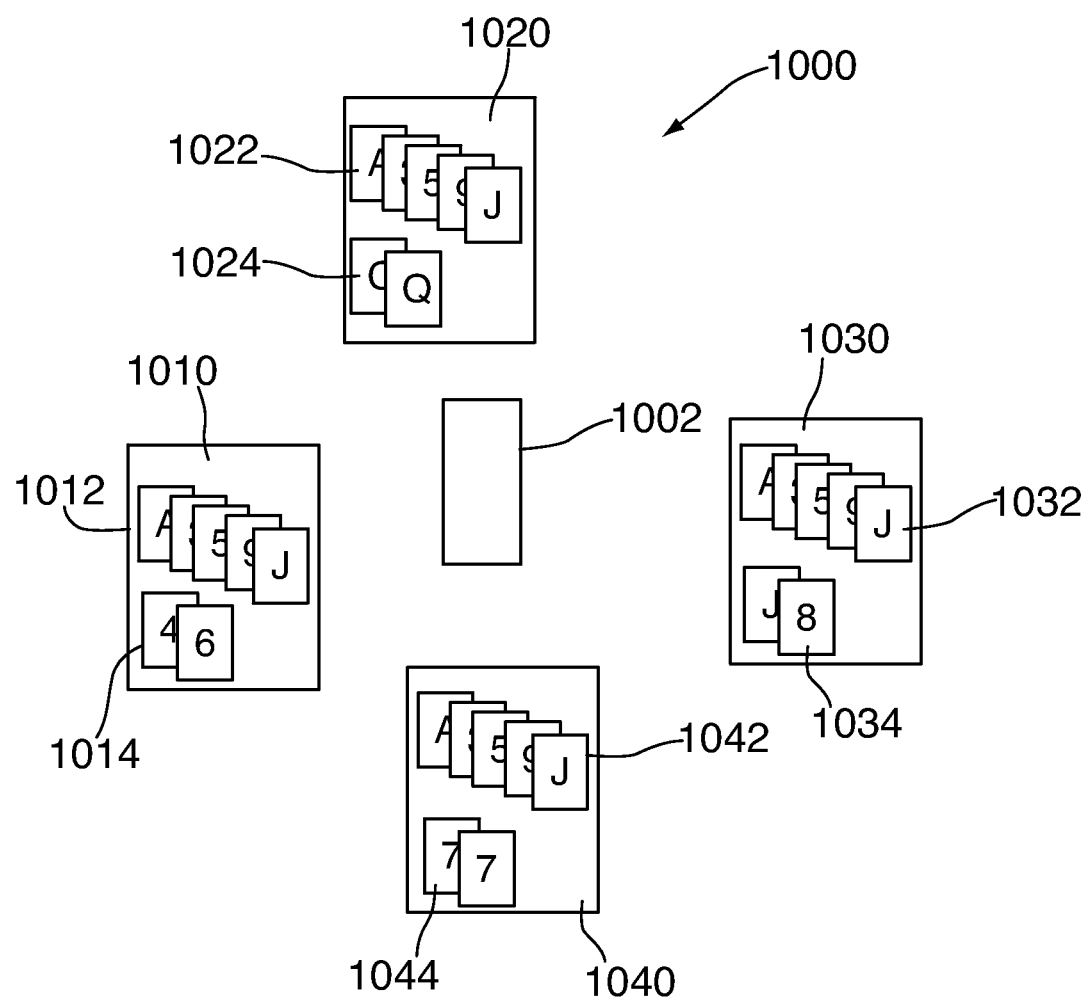
FIG. 10 is a schematic view of an illustrative system of devices sharing information to perform an application in accordance with one embodiment of the invention.

FIG. 10 is a schematic view of an illustrative system of devices sharing information to perform an application in accordance with one embodiment of the invention. System 1000 can include devices 1010, 1020, 1030 and 1040. In some embodiments, system 1000 can have a different number of devices, though only four are shown to avoid overcomplicating the drawing The devices can be positioned in the vicinity or around tag 1002, such that the devices can determine their relative positions by capturing representations of the tag. Tag 1002 can be provided by one or more of the users of the devices, or can be identified in the device environment. The electronic devices can be positioned around a tag (e.g., in a circle around the tag), or the tag can be located outside of a region enclosed by the devices (e.g., such that, for at least one device, there is another device between the device and the tag).

Each device 1010, 1020, 1030 and 1040 can operate an application that involves sharing information between the devices. For example, each device can operate an application that includes shared information displayed on all of the devices, and personal information displayed on individual devices only. In particular, device 1010 can include shared information 1012 and personal information 1014, device 1020 can include shared information 1022 and personal information 1024, device 1030 can include shared information 1032 and personal information 1034, and device 1040 can include shared information 1042 and personal information 1044, where some or all of shared information 1012, 1022, 1032 and 1042 are the same. In the particular example of FIG. 10, the shared information can include several cards usable by any player in a card game (e.g., poker), while the personal information can include several cards that are used only the user (e.g., hole cards).

In many card games, cards can be distributed by a dealer in a particular order. Users can then play in the same order in which cards were dealt. In the example of FIG. 10, devices 1010, 1020, 1030 and 1040 can determine their relative positions such that the applications operating on each device can coordinate to ensure that each device receives cards, or plays cards, in an appropriate order. For example, cards can be dealt in clockwise or counterclockwise order with a new dealer each round. Users can place their bets and change cards (if allowable), in the dealing order. The applications can coordinate to only allow the proper user to play by preventing other users (e.g., users other than the one whose turn it is to play) for providing inputs corresponding to the game play (e.g., place a bet, fold, request cards, etc.). When a user whose turn it is to play provides an appropriate instruction to the application, the application of the user's device can share the user's play with the other devices, and allow the device associated with the next user to play.

The applications can share data corresponding to the game play (or application operation) using any suitable approach.

In some embodiments, an application operating on one of the devices can serve as an anchor for the other applications. The anchor application can provide the shared information to the devices, and distribute private information in a manner that is consistent with the game play (e.g., distribute cards from a single deck) to each of the devices. The particular device serving as an anchor can change over time, for example based on device availability, game play (e.g., the device corresponding to the dealer serves as the anchor), device resources, or other criteria. In some embodiments, several devices can initially share information corresponding to the operation of the application such that, after the initial sharing, the amount of data that may need to be transferred between the devices can be reduced. For example, the devices can initially agree on a card deck and card order within the deck. Having that information, each device can run through the sequence of cards that are played without requiring receiving, from each device, the particular cards that were used. For example, if a user asks for one new card, all of the electronic devices can remove the top card from the predefined sequence, and continue the game. Using this approach, each device will not need to receive, from the device of the user receiving the card, the particular card that was received. The information to share during the game play can then be limited to bets or decisions to fold. In some embodiments, the particular application, and the impact of a user's interaction with the information on the other users, can determine how much the individual devices must communicate during the operation of the application.

In some embodiments, one or more devices that are not used by a particular user to interact with the application (e.g., a device that is not used to play a game) can be used to serve as an anchor, display shared information, provide a tag, or provide other functions to the devices used to interact with the application. For example, one or more devices can be used as a playing surface. In one implementation, a host device (e.g., an iPad, available from Apple Inc.) having a display can provide a tag used by the individual devices to determine the relative positioning of the devices. The host device can operate an application corresponding to the common application used by the devices such that shared information can be displayed by the host device. At appropriate times, each user can provide an instruction corresponding to the operation of the application (e.g., an instruction for playing the game) using the user's device, which can in turn provide the instruction to the host device. The host device can adjust its display based on the user provided instruction, and enable a subsequent device to interact with the application. A device receiving an instruction can share the instruction only with the host device, or can in some cases also transmit the instruction to other devices operating the application (e.g., to allow users that cannot see the host device display to play the game as well).

Figure 11:
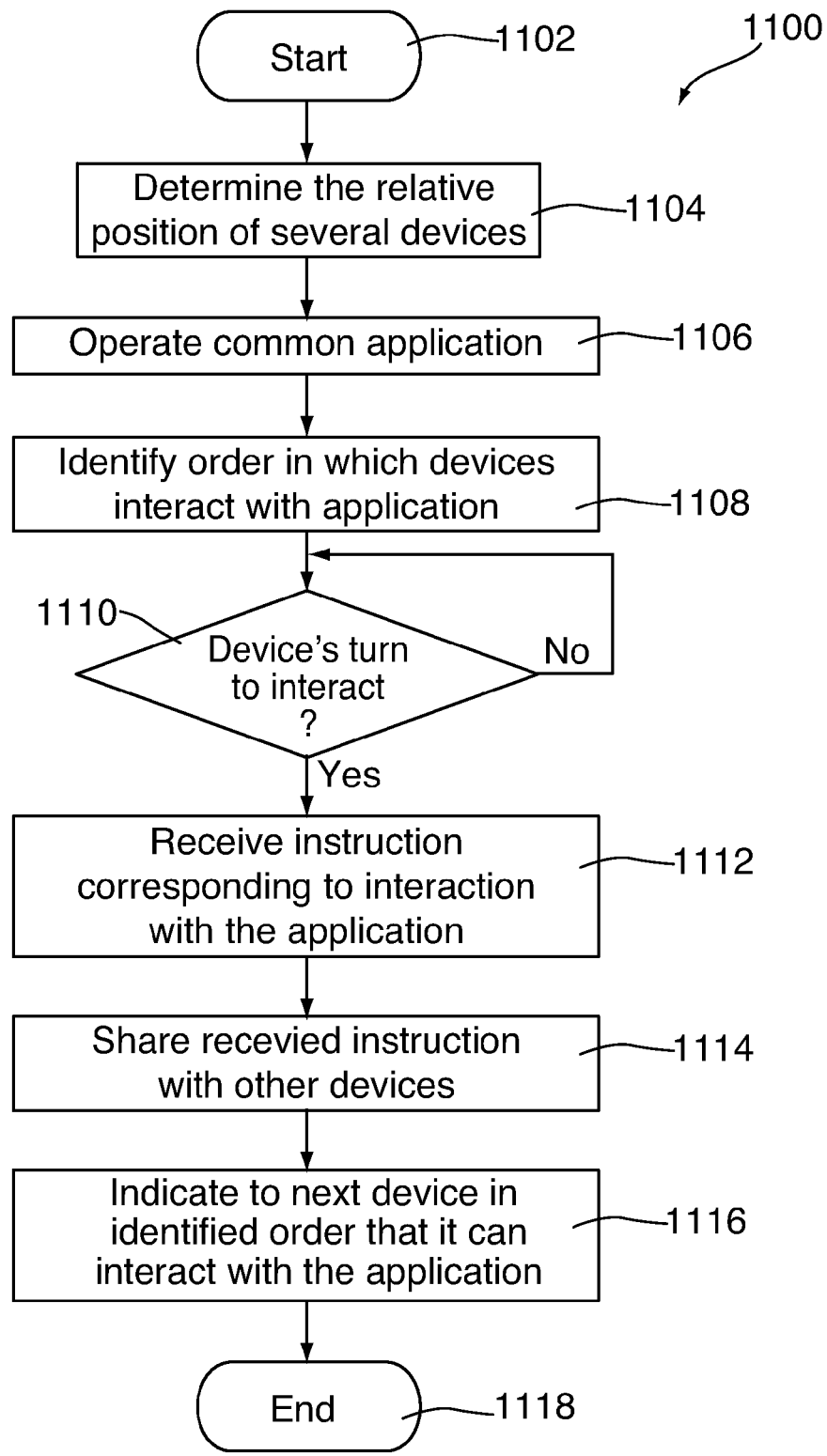
FIG. 11 is a flowchart of an illustrative process for interacting with an application based on the relative position of devices in accordance with one embodiment of the invention.

FIG. 11 is a flowchart of an illustrative process for interacting with an application based on the relative position of devices in accordance with one embodiment of the invention. Different parts of process 1100 can be performed by different devices including, for example, a device used by a user to interact with an application, or a device serving as a host for a common application (e.g., a host device providing a playing surface for other devices). Process 1100 can begin at step 1102. At step 1102, an electronic device can determine the relative position of several devices. For example, the electronic device and other devices can capture a representation of a tag, and determine their relative positions from the representation. At step 1106, the electronic device can operate a common application with the other devices. For example, the electronic device can operate a game or other application that involves or requires several devices to interact together. At step 1108, the electronic device can identify an order in which the devices are to interact with the application. For example, the electronic device can define a sequence in which different devices can provide instructions corresponding to the operation of the application (e.g., an order in which devices play in a game). The particular order can stay the same or vary over time, for example based on the operation of the application (e.g., based on who wins or loses a particular hand). In some embodiments, step 1106 can be performed before step 1104. In some embodiments, one or both of steps 1104 and 1108 can be performed as part of step 1106.

At step 1110, the electronic device can determine whether it is the device's turn to interact with the application. For example, the electronic device can determine whether it has received an indication from another device that it is authorized to provide an instruction to the application. As another example, the electronic device can monitor the interactions of other devices to determine whether another device immediately preceding the device in the identified order (e.g., identified at step 1108) has provided an instruction to interact with the application. If the electronic device determines that it is not the device's turn to interact with the application, process 1100 can return to step 1110 and continue to monitor for an indication that the device can interact with the application. If, at step 1110, the electronic device instead determines that it is the turn of the device to interact with the application, process 1100 can move to step 1112.

At step 1112, the electronic device can receive an instruction corresponding to an interaction with the application. For example, the electronic device can receive an instruction that corresponds to a play using private or shared information of the application (e.g., the device receives an instruction to play in a card game). At step 1114, the electronic device can share the received instruction with other devices. For example, the electronic device can share the instruction with some or all of the other devices displaying operating the application. As another example, the electronic device can share the received instruction with a host device serving as an anchor for the application. At step 1116, the electronic device can indicate to the next device in the identified order that it can interact with the application. For example, the electronic device can transfer a token or other code enabling the device to interact with the application. As another example, the electronic device can direct a host device to indicate to the next device in the sequence of devices that it may interact with the application (or a host device can automatically send such an indication to the next device in the sequence). Process 1100 can then end at step 1118.

In some embodiments, a device may provide an instruction corresponding to passing or not interacting with the application for a particular duration. For example, a user can elect to fold during a hand in a card game. In such cases, the electronic device can modify the order in which devices interact with the application (e.g., at step 1108) so that the device does not get an opportunity to interact with the application. Alternatively, the electronic device can instead skip steps 1112 and 1114, and directly indicate to the following device in the sequence that it may interact with the application.

Figure 12:
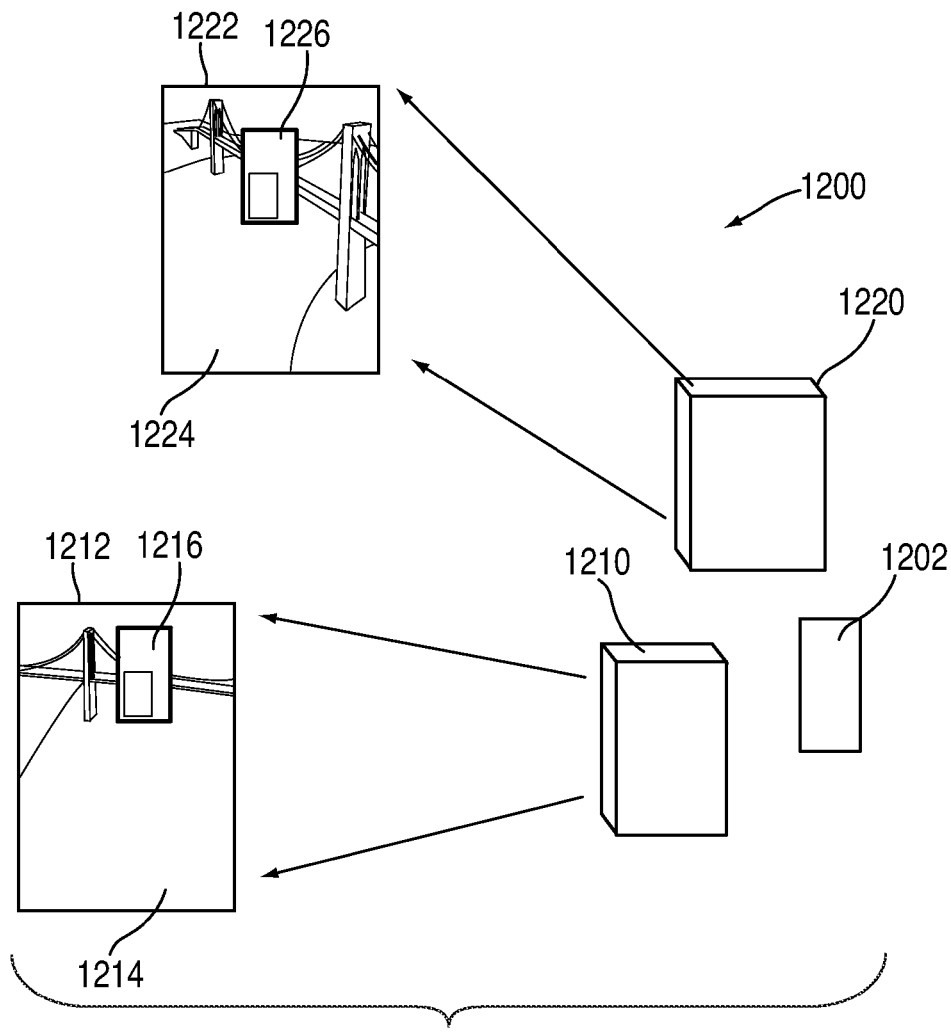
FIG. 12 is a schematic view of an illustrative system of several devices displaying the same virtual content in accordance with one embodiment of the invention.

Some applications used by several devices can include the display of common information. For example, some applications can include the display of virtual content or information within a captured representation of the device environment. In particular, some applications can overlay one or more virtual elements over an image captured of an environment. Although the following discussion will be provided in the context of providing virtual content on a captured image or video, it will be understood that virtual content can be provided on any representation captured by the electronic device. FIG. 12 is a schematic view of an illustrative system of several devices displaying the same virtual content in accordance with one embodiment of the invention. System 1200 can include electronic device 1210 and electronic device 1220. In some embodiments, system 1200 can have a different number of devices, though only two are shown to avoid overcomplicating the drawing. The devices can be positioned in the vicinity of or around tag 1202, such that the devices can determine their relative positions by capturing representations of the tag. Tag 1202 can be provided by one or more of the users of the devices, or can be identified in the device environment. The electronic devices can be positioned around a tag (e.g., in a circle around the tag), or the tag can be located outside of a region enclosed by the devices (e.g., such that, for at least one device, there is another device between the device and the tag).

Each of devices 1210 and 1220 can capture an image or video of the device environment using an appropriate sensor such as, for example, a camera. The perspective of the environment captured by each device can vary, for example based on the position of each device relative to the environment. In some embodiments, devices 1210 and 1220 can operate a same or different application to provide different functionality to a user. In some cases, an application can cause the display of virtual content overlaid on a captured image of the device environment. In particular, electronic device 1210 can include display 1212 in which environment 1214 and virtual content 1216 are displayed, while device 1220 can include display 1222 in which environment 1224 and virtual content 1226 are displayed. In some cases, virtual content 1216 and 1226 can correspond to the same virtual content (e.g., provided by a same application operating in conjunction on both devices).

Electronic devices 1210 and 1220 can display the virtual content from any suitable perspective. In some embodiments, the electronic devices can display the virtual content from a same perspective, which each user can then change. For example, a user can move the electronic device around the virtual location of the displayed virtual content to see other perspectives of the content. Alternatively, a user can interact directly with the content on the device display, and cause the content to move, rotate, or otherwise change. In the particular example shown in displays 1212 and 1222, the virtual content is displayed from the same perspective, even though the background, corresponding to the device environment, is different.

Figure 13:
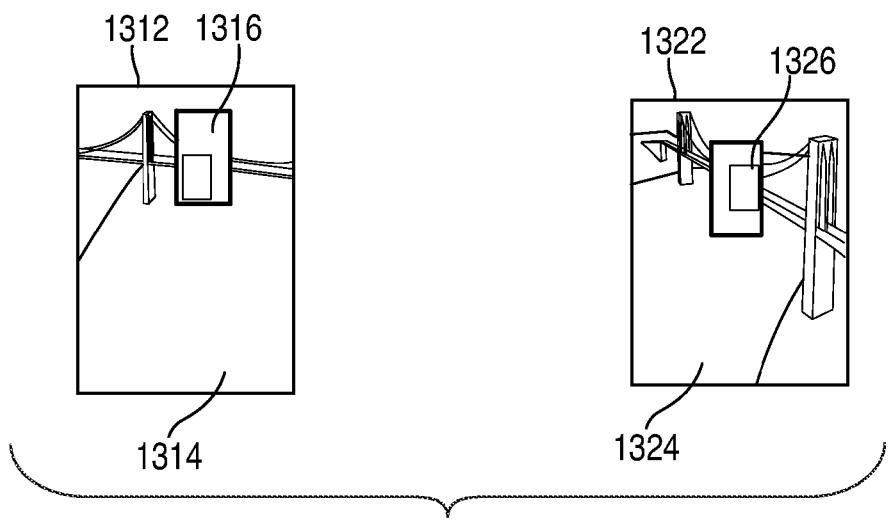
FIG. 13 is a schematic view of illustrative displays of virtual content from different perspectives in accordance with one embodiment of the invention.

In some cases, the virtual content can instead be considered to be an integral part of the environment of the devices. In such an implementation, the perspective of the virtual content provided by each device would differ, as each device has a different perspective of the environment (e.g., as shown from the images captured of the environment by each device). FIG. 13 is a schematic view of illustrative displays of virtual content from different perspectives in accordance with one embodiment of the invention. Display 1312 can correspond to a display provided by electronic device 1210 (FIG. 12), and display 1322 can correspond to a display provided by electronic device 1220 (FIG. 12). The particular perspectives of each device can correspond to the positions and orientations of the devices relative to tag 1202 (FIG. 12). Display 1312 can include environment 1314 and virtual content 1316 (corresponding to environment 1214 and virtual content 1216, FIG. 12). In particular, the perspectives displayed for the environment and virtual content can be the same or similar as those of display 1212. Display 1322 can include environment 1324 and virtual content 1326 (corresponding to environment 1224 and virtual content 1226, FIG. 12). In contrast with the perspectives displayed in display 1222, however, the displayed perspective of virtual content 1326 can differ from the displayed perspective of virtual content 1226 (e.g., the position of the black box within the white box can change). In particular, virtual content 1326 can be considered to be static or fixed within the environment, and therefore will appear differently from the perspectives of devices 1210 and 1220.

The different electronic devices can provide the same virtual content for display using any suitable approach. In some embodiments, the virtual content can include one or more elements that are displayed on all devices operating an application providing the virtual content (e.g., shared virtual content). In such cases, each device can have available to it, using the application operating on the device, information defining the virtual content and expressing a manner in which the virtual content is to be displayed. For example, an application can include information defining a static or animated object to display in a captured environment. In some embodiments, it may be desirable to display the same virtual content in the same location within an environment. The devices displaying the virtual content can then, in some cases, define an initial location and orientation for the content. For example, the virtual content can be displayed on the tag, and oriented relative to a coordinate system of the tag.

When a device moves in the environment, the perspective of the device of the virtual content can change. For example, the perspective of the same virtual content is different in displays 1312 and 1322. A device can retrieve information describing the manner in which to display virtual content based on the device perspective using any suitable approach. In one implementation, a device can have locally stored sufficient information to define the virtual content from several or all perspectives. For example, a device can include a three-dimensional definition of the virtual content. In such cases, in response to determining that the virtual content should be displayed in a new perspective, the electronic device can determine, from the definition, a manner in which to display the content. For example, the electronic device can determine the appearance of the content from a particular perspective.

In another implementation, an electronic device can instead or in addition not have a complete definition of the virtual content, or include only a partial definition that cannot be applied to a requested perspective (or to an initial perspective). To display the proper perspective for the virtual content, the electronic device can request, from another device (or a host device) having the complete definition, or a device having at least a partial definition that includes the requested perspective, sufficient information for displaying the virtual content. For example, the electronic device can request a complete or partial definition of the virtual content. As another example, the electronic device can request an image corresponding to the displayed perspective of the virtual content. In such cases, a particular device having a complete or partial definition file for the virtual content can process the requested perspective to determine the appearance of the virtual content, and transmit an image corresponding to the determined appearance to the requesting device. This approach may be desirable in situations where, for example, the device displaying the virtual content has limited processing resources, or when there is a fast communications path available between the device displaying the virtual content and the particular device processing requests received from one or more devices. The other device can include, for example, another device displaying the virtual content (e.g., another device used by another user), a host device or other device serving as an anchor for the display of the virtual content, or a combination of these. In some embodiments, several devices can combine to send aggregated information to the device for displaying the virtual content from the requested perspective.

In some embodiments, the virtual content can include content that is provided by a device for display by other devices, but not by the device providing the virtual content. For example, the virtual content can include an avatar representing the user of the device in the device environment (e.g., in a first person game). The device to which the avatar corresponds, therefore, may not display the avatar in a captured image of the device environment, although other devices may. In one implementation, a device can determine whether another device is within the field of view of an image captured by the device. For example, a device can determine, from the relative position of the other device as determined using the tag, whether the other device is within a field of view of a camera used to capture images of the device environment. If the device determines that the other device is within the field of view, and may therefore appear in a captured image of the environment, the electronic device can display an avatar or other virtual content associated with the other device in a position corresponding to that of the device. For example, the device can replace the image of the other device with the avatar, or can instead or in addition display the avatar in addition to the image of the other device.

The electronic device displaying the avatar can retrieve information for displaying the avatar from any suitable source. In some embodiments, the application operating on the device can include one or more avatars available to display to represent other devices. In response to determining that an avatar is to be displayed, the electronic device can automatically select an avatar, or receive a selection of a particular avatar from the user of the other device represented by the avatar, or receive a selection from the device user. In some embodiments, the electronic device can store an association between a particular other device and a displayed avatar. The avatars can be generic or customizable. For example, a user can customize an avatar corresponding to a particular other device. As another example, another device can send customization information for the other device. The customized avatar can then serve, in some ways, as a personal virtual calling card.

In some embodiments, the device for which the avatar is displayed can instead or in addition provide information for defining the avatar to the other devices to enable the other devices to display the avatar. For example, the device can broadcast a definition file to other users operating the same application. As another example, several devices can exchange their avatars as part of an initialization step of the application, or during the use of the application (e.g., in response to detecting that an avatar should be displayed, or may soon need to be displayed). In some embodiments, a host device used by one or more devices operating the application can instead or in addition serve as a repository for different virtual content. Each device needing to display a particular virtual element can retrieve or receive display information from the host device.

In some embodiments, one or more devices can instead or in addition interface or interact with virtual content. For example, one or more devices can direct the virtual content to be animated in a particular manner. As another example, one or more devices can change an attribute of the displayed virtual content (e.g., change a color or a shape of the virtual content). As still another example, one or more devices can direct the virtual content to perform a particular action within the context of the application (e.g., direct virtual content to walk to a particular location and look around). As still yet another example, one or more devices can direct several instances of virtual content to interact with each other (e.g., in a game application, several devices each control a different instance of virtual content, and direct the different instances to fight to win the game).

Several approaches can be used to display interactive virtual content. In a first approach, the content can be displayed such that only the device interacting with the content sees the particular interaction. In other words, every device may display the virtual content in a different manner. This approach, however, may defeat the purpose of having several devices interact together, as each device may end up displaying virtual content independently of the other devices.

In a second approach, the interactions of a device with displayed virtual content can appear on the displays of other devices. In other words, the interaction of each device with the virtual content may be propagated across the different devices displaying the content. Any suitable approach can be used to ensure that all of the devices displaying the virtual content detect an interaction with the content, and display the interaction or the result of the interaction. Devices can monitor for interactions with virtual content, and update or revise the displayed virtual content at any suitable time. In some embodiments, it may be sufficient to revise displayed virtual content at different intervals. For example, in an application where several users each take turns interacting with content (e.g., turns based on the relative position of devices), it may be sufficient for devices to update or revise displayed virtual content at the end of each turn, or before beginning of each turn. In such cases, the displayed virtual content can be modified by only a single device at any point in time, where the particular device is determined from a pre-defined order in which devices can interact with the virtual content (e.g., as determined by the relative position of the devices).

In some embodiments, it may instead be desirable to update the displays of some or all of the devices in real-time or in near real-time (i.e., at rates faster than predetermined intervals, as above). In such cases, it may be necessary for each device to share the instructions received by the device with respect to the virtual content when they are received. In addition, each device may need to receive the instructions provided by users of other devices with respect to the same virtual content. Each device can process the instructions detected by an input interface of the device and the instructions received from other devices to determine how to adjust the display of the virtual content. The different instructions can include time stamps to ensure that virtual content is modified in a consistent manner for all devices (e.g., so that lags or delays due to transferring instructions between devices has a minimized effect).

Several devices can share information describing the interactions of the devices with virtual content using any suitable approach. In some embodiments, the manner in which interactions are shared can depend on the manner in which the virtual content is provided to the different devices. In one implementation, some or all of the devices displaying the virtual content can include complete or sufficiently complete definitions of the virtual content (e.g., a complete definition for a range of likely perspectives of the virtual content). In response to receiving an input from a user or an instruction received from another device to interact with displayed virtual content, the devices can determine how to modify the display of the virtual content to incorporate the user interaction, and display the modified virtual content. The transmitted interaction can include, for example, a combination of inputs detected by an electronic device, instructions for interacting with the virtual content as interpreted from the detected inputs, information describing a modification of the virtual content, or combinations of these. Upon receiving a transmission, an electronic device can apply the interaction of the transmission to the displayed perspective of the virtual content. In some cases, a particular interaction of a first device may not change the appearance of the virtual content on a second device due to differences in displayed perspectives of the virtual content between the two devices.

An electronic device can associate timing information with transmitted interactions. This can allow each device to determine an order in which a sequence of interactions by several devices is to be applied to the virtual content. In some cases, a particular interaction can be ignored or disregarded because it involved portions of the virtual content that were modified before the particular interaction was received. In some cases, the electronic device on which the particular interaction was provided can indicate to its user that the interaction was not implemented.

In some embodiments, one or more electronic devices can have an insufficient definition of the virtual content. For example, one or more electronic devices can receive information regarding the virtual content from a host device serving as an anchor, or from another electronic device. Because the devices may not have definition information for the virtual content, the devices may not know how to modify the displayed virtual content in response to receiving a particular interaction. Instead, the electronic device can transmit the interaction to the host device, which can aggregate some or all of the interactions received from the different devices. The host device can apply the interactions to the virtual content (e.g., based on the order received or on a time stamp), and define revised perspectives of the virtual content for each device. For example, the host device can apply interactions to a defined model of the virtual content, and determine how the model changes in response to the interactions. The host device can then transmit, to each device, a revised perspective of the virtual content corresponding to each device. Using this approach, the host device may send revised perspectives for every received interaction, for every sequence of received interactions (e.g., every 5 interactions, or once interactions are received from 3 different devices), at particular intervals (e.g., every 1, 5, 30 or 60 seconds), or combinations of these. In some embodiments, the host device may also send revised perspectives to devices moving relative to the tag or to the virtual content, whether or not a device interacted with the virtual content.

In some embodiments, several electronic devices can provide different instances of virtual content to display simultaneously on at least two devices. For example, two devices used to play a game can each provide an avatar or game element for display by at least the two devices. Any suitable approach can be used to ensure that the interactions and perspectives of the several instances of virtual content are displayed in a consistent manner by several devices. In some embodiments, each device can provide definition information to the other devices for the virtual content provided by the device. Using this approach, each device can include sufficient definition information to independently process different interactions by different devices with the several instances of virtual content (including interactions by devices with instances of virtual content that they did not provide). This approach may also allow all of the devices to define and display interactions between displayed instances of virtual content. For example, each device can determine how to display a first avatar hit by a second avatar (e.g., the definitions of both avatars are known, so the effect of contact between the avatars can be defined).

In some embodiments, each device defining a particular instance of virtual content can instead or in addition provide appropriate representations of the particular instance of virtual content to other devices. In other words, other devices may not include information defining the instance of virtual content, and may need to rely on the device for images depicting the appearance and perspective of the virtual content. In this implementation, a device providing the instance of virtual content can detect interactions from the user of the device with the instance of virtual content, as well as receive instructions to interact with the instance of virtual content from other devices. The device can aggregate the detected and received interactions, and determine a revised appearance and perspective of the instance of virtual content for each of the other devices displaying the content. The device can then transmit images corresponding to the revised perspectives of the instance of virtual content to each of the other devices.

In addition, the same device can instead or in addition interact with another instance of virtual content provided and defined by another device. The device can then transmit its interactions with the other instance of virtual content to the other device. The device can receive back from the other device one or more images corresponding to changes in the perspective or appearance of the other instance of virtual content.

The following example will illustrate several devices displaying common virtual content used as part of a game. Several devices can initially determine their relative positions based on captured representations of a tag. For example, several devices operating an application corresponding to the game can be placed around a tag. The devices can capture representations of the tag, which can then be shared to determine the relative positions of the devices. In addition, each electronic device can define a coordinate system based on the tag that can be common with the other electronic devices. The common coordinate system can be used to display virtual content corresponding to a game in a similar manner on each of the devices.

Figure 14A:
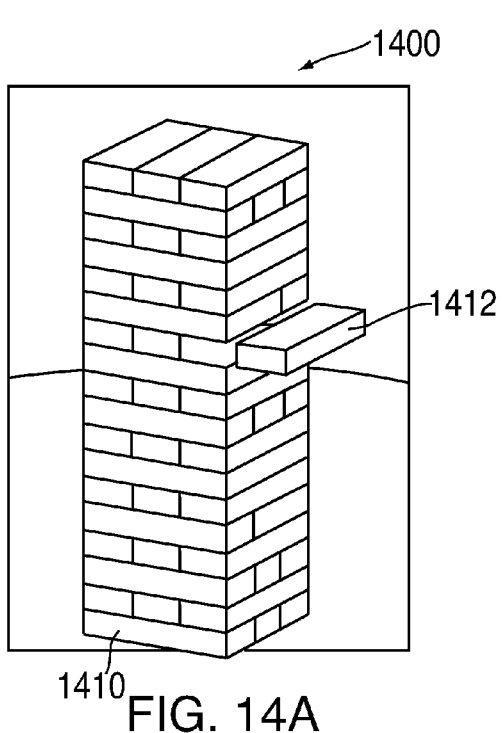
FIGS. 14A and 14B are schematic views of illustrative displays of virtual content with which several users can interact in accordance with some embodiments of the invention.
Figure 14B:
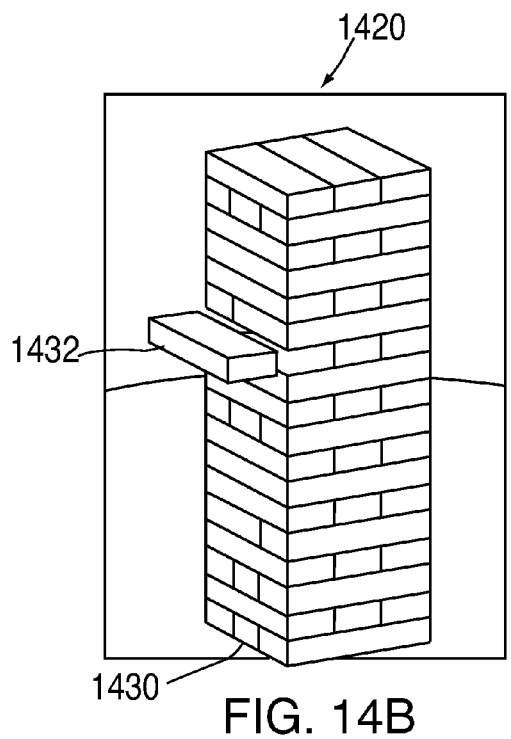

FIGS. 14A and 14B are schematic views of illustrative displays of virtual content with which several users can interact in accordance with some embodiments of the invention. Display 1400, shown in FIG. 14A, can include tower 1410 of game elements. For example, tower 1410 can be constructed by stacking different blocks. A user can play the game by removing a game element (e.g., game element 1412) from tower 1410, and replacing the game element on the top of the tower. If the user causes the tower to topple when the user removes the game element, the user can lose. If the user successfully moves a game element, the following user (e.g., using a different device) can interact with the tower. Several users can interact with the same tower using different devices. For example, display 1400 can be provided by a device of a first user, where the device has a first perspective relative to the tag, which can serve to provide a reference frame for displaying the tower.

Several devices used by different users can display the tower and game elements so that users of the different devices can play the game together. In some cases, the particular portion or perspective of the displayed tower and game elements can correspond to a perspective of a device relative to the tag. Display 1420, shown in FIG. 14B, can include tower 1430 of game elements (including game element 1432), which can correspond to tower 1410 and game element 1410. In particular, the virtual content provided on display 1420 can be the same as the virtual content displayed in display 1400, but displayed from a different perspective.

Each user can interact with the game elements provided on the displays of individual devices using any suitable approach. In some embodiments, a user can interact with a game element using an input interface of the device. For example, a user can use a touch surface, button, dial, joystick, or other input interface to select or move one or more game elements. In some embodiments, a user can interact with a game element by controlling the output of one or more sensors within the device. For example, a user can control the stability with which the user removes a game element from the tower based on the output of one or more motion detection components within the device. Each user can interact in turn with the displayed game elements, for example in an order determined from the relative position of the devices. As each user moves a game element, some or all of the user's device and other devices can display the movement of the game element. This can allow each user playing the game to monitor the flow of the game.

Figure 15A:
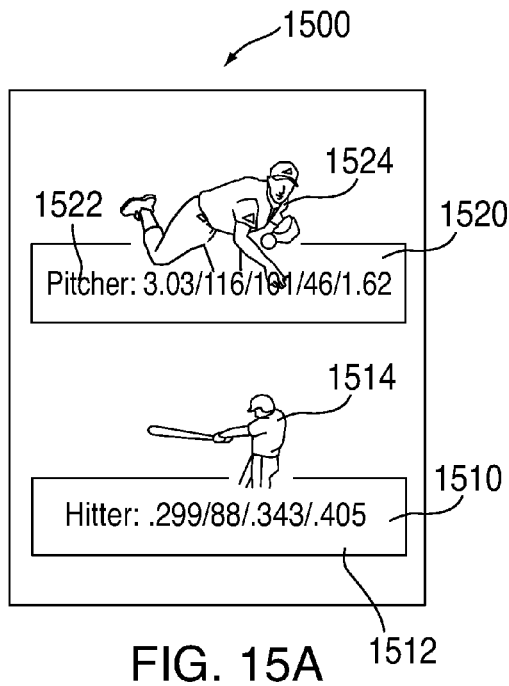
FIGS. 15A and 15B are schematic views of illustrative displays provided by an application in which virtual content provided by several users can be displayed in accordance with some embodiments of the invention.
Figure 15B:
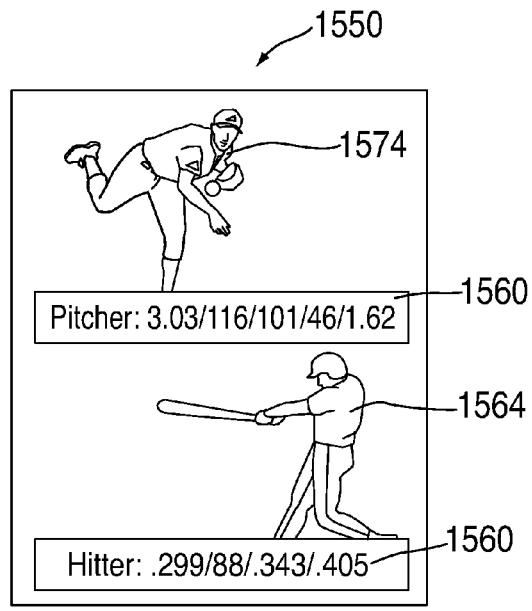

In some embodiments, several users can play a game in which each user provides virtual content that interacts together as part of the game. FIGS. 15A and 15B are schematic views of illustrative displays provided by an application in which virtual content provided by several users can be displayed in accordance with some embodiments of the invention. Display 1500, shown in FIG. 15A, can include card 1510 provided by a first user and card 1520 provided by a second user. Card 1510 can include attributes 1512, while card 1520 can include attributes 1522. Based on attributes of the cards, the first and second users can battle and determine a victor. The card attributes can include, for example, points, life values, attack and defense strength, performance statistics (e.g., sporting statistics corresponding to a particular sport), or other quantities that can be compared. In some embodiments, a user can provide one or more inputs to dynamically adjust one or more of the card characteristics during game play. In the example of FIGS. 15A and 15B, the cards and game can correspond to a sports related game in which players corresponding to each card can oppose each other.

Each of cards 1510 and 1520 can include any suitable attributes, including similar attributes or complimentary attributes. In the example of display 1500, attributes 1512 of card 1510 can correspond to pitching statistics (e.g., ERA, hits, strikeouts, runs, and WHIP), while attributes 1522 of card 1520 can correspond to hitting statistics (e.g., batting average, home runs, hits, OBP, and SLG). The cards can correspond to particular players, whose names can be indicated on each card. To enhance the users' experience with the game, each card can be associated with an avatar performing a game action in relation with the card attributes. The avatar can be displayed using any suitable approach, including for example appear to be growing from the card. In the example of display 1500, card 1510 can include hitting avatar 1514, while card 1520 can include pitching avatar 1516. The users can interact with the avatars to play a game.

Display 1550, shown in FIG. 15B, can include cards 1560 and 1570, and associated avatars 1564 and 1574 corresponding to the cards and avatars displayed in display 1500. Each user can interact with the avatar 1564 or 1574 provided by the user for use in the application. For example, each user can provide an input using one or more input interfaces, or can manipulate the device such that one or more sensor outputs control the movement or action of the avatars. In some cases, the user's inputs can modify an avatar action within parameters determined from the attributes of each card. For example, the attributes of a particular card can determine a range of accuracies or strengths with which a particular avatar can throw or hit a ball, and the user's input can determine at what value within the ranges the avatar operates. The particular display provided for each device can be the same or differ. In some cases, each user can view the avatars from a perspective corresponding to the relative position of the user.

Figure 16:
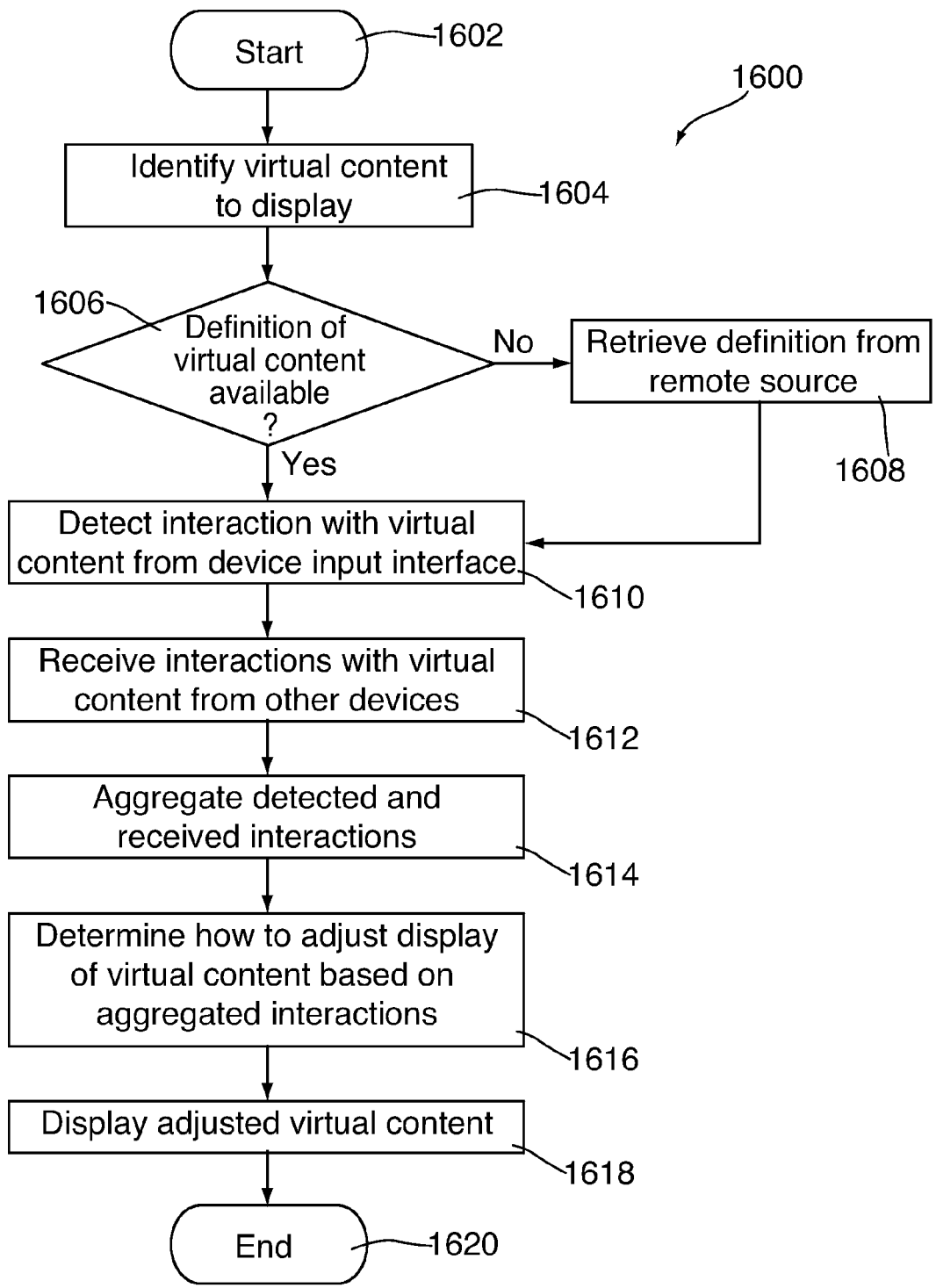
FIG. 16 is a flowchart of an illustrative process for adjusting the display of virtual content on several devices in accordance with one embodiment of the invention.

FIG. 16 is a flowchart of an illustrative process for adjusting the display of virtual content on several devices in accordance with one embodiment of the invention. Process 1600 can begin at step 1602. At step 1604, an electronic device can identify virtual content to display. For example, the electronic device can receive an instruction from a user of the device to display particular virtual content. As another example, the electronic device can receive a communication from another device to display particular virtual content. At step 1606, the electronic device can determine whether a definition of the virtual content is available to the device. For example, the electronic device can determine whether information defining particular virtual content is locally stored by the device. If the electronic device determines that a definition of the virtual content is not available, process 1600 can move to step 1608. At step 1608, the electronic device can retrieve a definition of the virtual content from a remote source. For example, the electronic device can receive information defining particular virtual content from another device providing the content, or from a host device. Process 1600 can then move to step 1610.

If, at step 1606, the electronic device instead determines that definition information for the virtual content is available, process 1600 can move to step 1610. At step 1610, the electronic device can detect interactions with the virtual content from an input interface of the device. For example, the electronic device can detect a user input using an interface, where the input directs the device to interact with the virtual content (e.g., move the virtual content, or change a characteristic or attribute of the virtual content). At step 1612, the electronic device can receive interactions with the virtual content from other devices. For example, the electronic device can receive a communication from another device describing an interaction of a user of the other device with the virtual content. At step 1614, the electronic device can aggregate the detected and received interactions with the virtual content. For example, the electronic device can define a queue or sequence of interactions with the virtual content. In some embodiments, process 1600 can skip step 1614 and move to step 1616 each time an instruction to interact with the virtual content is detected or received.

At step 1616, the electronic device can determine how to adjust the display of the virtual content based on the aggregated instructions. For example, the electronic device can apply the aggregated instructions in a particular order (e.g., in the order in which they were received, or based on timing information) to the definition of the virtual content. The electronic device can then determine how to adjust or change the appearance of the virtual content based on the interactions. At step 1618, the electronic device can display the virtual content using the determined adjustments. For example, the electronic device can display the virtual content in a new configuration. As another example, the electronic device can display an animation of the virtual content as it moves from its initial appearance or configuration to the adjusted appearance or configuration. Process 1600 can perform steps 1616 and 1618 at any suitable interval including, for example, each time an interaction is detected or received, based on a status of an application providing the virtual content, at timed intervals, or combinations of these. Process 1600 can then end at step 1620.

Figure 17:
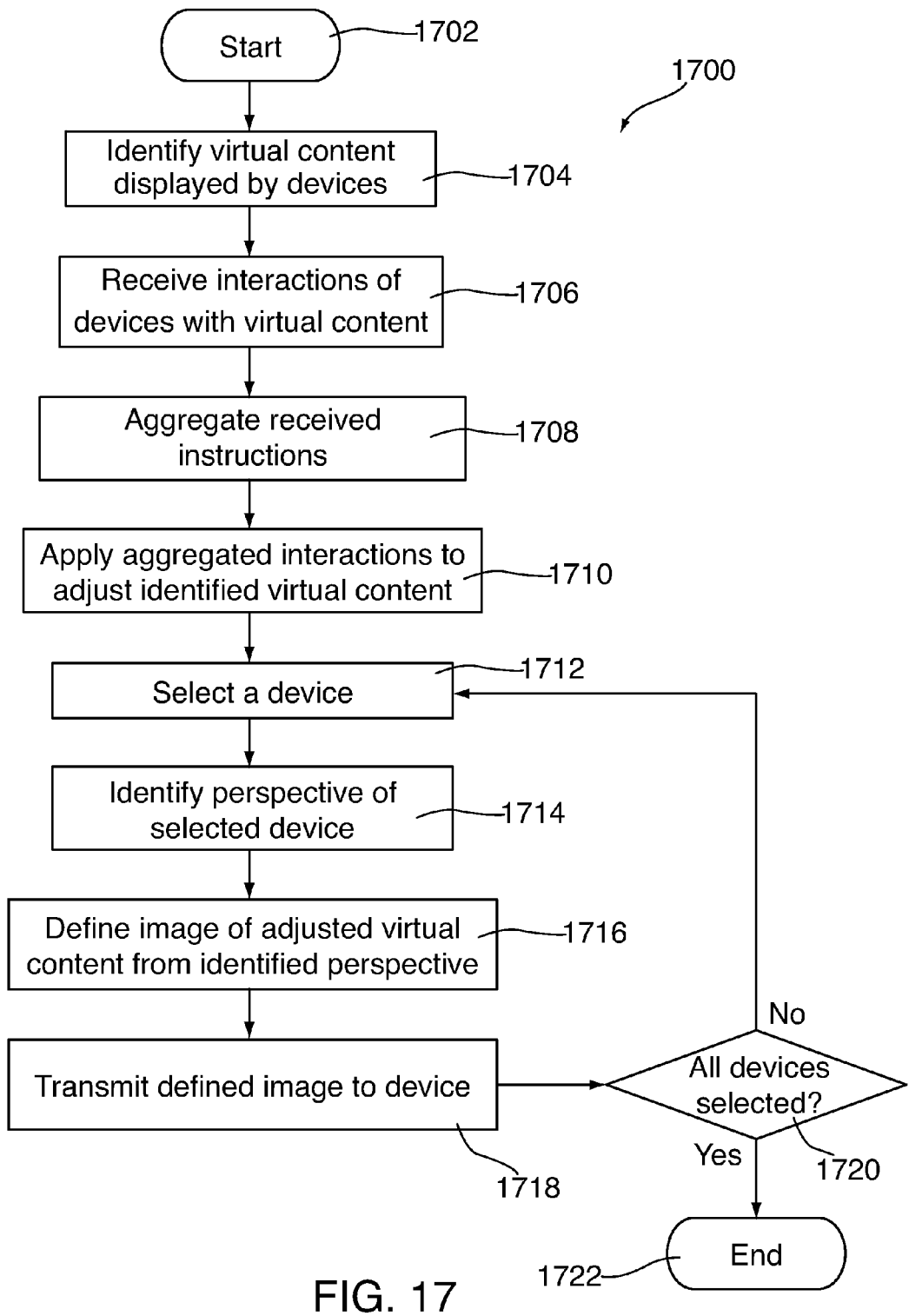
FIG. 17 is a flowchart of an illustrative process for changing the appearance of virtual content displayed by an electronic device in accordance with one embodiment of the invention.

FIG. 17 is a flowchart of an illustrative process for changing the appearance of virtual content displayed by an electronic device in accordance with one embodiment of the invention. Process 1700 can begin at step 1702. At step 1704, a host device can identify virtual content displayed by one or more electronic devices. For example, the host device can identify one or more electronic devices operating an application used to display virtual content, and the virtual content displayed by those devices. At step 1706, the host device can receive interactions of one or more of the devices with the virtual content. For example, the host device can receive instructions from one or more devices to change one or more attributes or characteristics of the displayed virtual content. As another example, the host device can receive instructions from one or more devices interacting with a displayed game element. At step 1708, the host device can aggregate the received instructions. For example, the host device can define a queue or sequence of interactions with the virtual content. In some embodiments, process 1700 can skip step 1708 and move to step 1710 each time an instruction to interact with the virtual content is received.

At step 1710, the host device can determine how to adjust the display of the virtual content based on the aggregated instructions. For example, the host device can apply the aggregated instructions in a particular order (e.g., in the order in which they were received, or based on timing information) to the definition of the virtual content. The host device can then determine how to adjust or change the appearance of the virtual content based on the interactions.

At step 1712, the host device can select an electronic device displaying the identified virtual content. For example, the host device can select one of several devices operating an application used to display the virtual content. At step 1714, the host device can identify the perspective of the selected device relative to the virtual content. For example, the host device can determine the perspective of the device relative to a tag, and the orientation and position of the virtual content relative to the same tag. At step 1716, the host device can define an image of the adjusted virtual content corresponding to the identified perspective of the selected device. For example, the host device can determine the appearance of the adjusted virtual content from the device perspective using the definition information of the virtual content. At step 1718, the host device can transmit the defined image to the device for display. For example, the host device can transmit the image so that it can be used by an appropriate application of the electronic device.

At step 1720, the host device can determine whether all devices were selected. For example, the host device can determine whether all devices that do not have a complete definition of the virtual content have been selected. As another example, the host device can determine whether all of the devices displaying the virtual content have received images corresponding to the adjusted display of the virtual content. In some embodiments, the host device can skip devices for which the displayed perspective and appearance of the virtual content does not change following the interactions with the virtual content. For example, a device having a perspective of a backside of virtual content may not see any difference in appearance of the virtual content following an interaction with a frontside of the virtual content. If the host device determines that all of the devices have not been selected, process 1700 can return to step 1712 and select another device. If, at step 1720, the host device instead determines that all of the devices were selected process 1700 can move to step 1722 and end.

Figure 18:
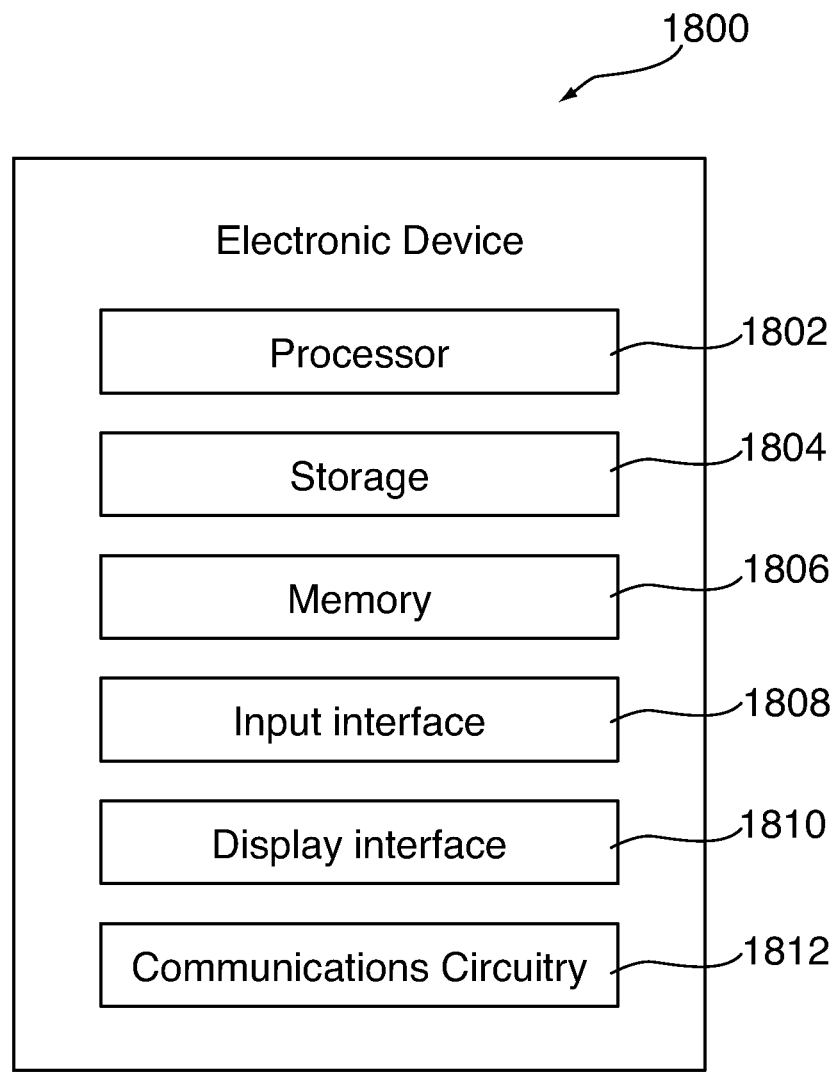
FIG. 18 is a schematic view of an electronic device in accordance with one embodiment of the invention.

Any suitable electronic device can be used to provide some or all of the features described in connection with embodiments of this invention. For example, the electronic device can include cellular telephone, a messaging device, a gaming console, a personal media player, a desktop or notebook computer, a slate, tablet, or pad computing device, a medical device, exercise equipment, or any other electronic device. FIG. 18 is a schematic view of an electronic device in accordance with one embodiment of the invention. Electronic device 1800 may include processor 1802, storage 1804, memory 1806, input interface 1808, display interface 1810, and communications circuitry 1812. In some embodiments, one or more of electronic device components 1800 may be combined or omitted (e.g., combine storage 1804 and memory 1806, or omit input interface 1808). In some embodiments, electronic device 1800 may include other components not combined or included in those shown in FIG. 18 (e.g., a power supply, a bus, positioning circuitry, or other input or outer interfaces), or several instances of the components shown in FIG. 18. For the sake of simplicity, only one of each of the components is shown in FIG. 18.

Processor 1802 may include any processing or control circuitry operative to control the operations and performance of electronic device 1800. For example, processor 1802 may be used to run operating system applications, firmware applications, media playback applications, media editing applications, or any other application. In some embodiments, a processor may drive a display and process inputs received from a user interface.

Storage 1804 may include, for example, one or more storage mediums including a hard-drive, solid state drive, flash memory, permanent memory such as ROM, any other suitable type of storage component, or any combination thereof. Storage 1804 may store, for example, media data, application data, firmware, user preference information, and any other suitable information or any combination thereof. Memory 1806 can include cache memory, semi-permanent memory such as RAM, and/or one or more different types of memory used for temporarily storing data. In some embodiments, memory 1806 can also be used for storing data used to operate electronic device applications, or any other type of data that may be stored in storage 1804. In some embodiments, memory 1806 and storage 1804 may be combined as a single storage medium.

Input interface 1808 may provide inputs to input/output circuitry of the electronic device. Input interface 1808 may include any suitable input interface, such as for example, a button, keypad, dial, a click wheel, or a touch screen. In some embodiments, electronic device 1800 may include a capacitive sensing mechanism, or a multi-touch capacitive sensing mechanism.

Display interface 1810 can be operatively coupled to processor 1802 for providing visual outputs to a user. Display interface 1810 can include any suitable type of display including, for example, a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display interface 1810 can be configured to display a graphical user interface that can provide an easy to use interface between a user of the computer system and the operating system or application running on the system.

Communications circuitry 1812 can be operative to communicate with other devices or with one or more servers using any suitable communications protocol. Electronic device 1800 can include one more instances of communications circuitry for simultaneously performing several communications operations using different communications networks. For example, communications circuitry may support Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VOIP), any other communications protocol, or any combination thereof. In some embodiments, communications circuitry 1812 may include one or more communications ports operative to provide a wired communications link between electronic device 1800 and a host device. For example, a portable electronic device may include one or more connectors (e.g., 30 pin connectors or USB connectors) operative to receive a cable coupling the portable electronic device to a host computer. Using software on the host computer (e.g. iTunes available from Apple Inc.), the portable electronic device may communicate with the host computer.

In some embodiments, electronic device 1800 may include a bus operative to provide a data transfer path for transferring data to, from, or between control processor 1802, storage 1804, memory 1806, input interface 1808, display interface 1810, communications circuitry 1812, and any other component included in the electronic device.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. An electronic device for interacting with a plurality of virtual avatars, comprising a camera, communications circuitry, and control circuitry, the control circuitry operative to:
   direct the camera to capture an image of a tag;
   retrieve locally stored information defining a first virtual avatar;
   direct the communications circuitry to receive information defining a second virtual avatar provided by another electronic device;
   display the first and second virtual avatars using a coordinate system corresponding to the tag;
   receive an input providing an instruction for manipulating at least one of the first and second virtual avatars; and
   change the display of the at least one of the first and second virtual avatars to reflect the received instruction for manipulating the at least one of the first and second avatars.

2. The electronic device of claim 1, wherein the control circuitry is further operative to:
   direct the communications circuitry to receive another instruction for manipulating at least one of the first and second virtual avatars, wherein the other instruction is received by the other electronic device; and
   change the display of the at least one of the first and second virtual avatars to reflect the received other instruction for manipulating the at least one of the first and second virtual avatars.

3. The electronic device of claim 1, wherein the control circuitry is further operative to:
   direct the communications circuitry to transmit the received instruction for manipulating the at least one of the first and second virtual avatars to the other electronic device.

4. The electronic device of claim 1, wherein the control circuitry is further operative to:
   determine, based on the captured image of the tag, that the position of the device relative to the tag has changed; and
   change the appearance of the first and second virtual avatars to correspond to the changed position of the device relative to the tag.

5. The electronic device of claim 1, wherein the control circuitry is further operative to:
   direct the camera to capture an image of the device environment, wherein the tag is present in the device environment;
   overlay the first and second avatars on the captured image; and
   display the captured image with the overlaid first and second avatars.

6. The electronic device of claim 1, wherein the control circuitry is further operative to:
   identify first attributes corresponding to the first virtual avatar;
   identify second attributes corresponding to the second virtual avatar; and
   wherein the instruction enables a change in the display of the one of the first and second virtual avatars within boundaries defined by the first and second attributes, respectively.

7. The electronic device of claim 1, wherein the control circuitry is further operative to:
   capture an image of the tag using the other electronic device; and
   display the first and second virtual avatars in the same position relative to the tag on each of the electronic devices.

8. The electronic device of claim 7, wherein the control circuitry is further operative to:
   determine a first perspective corresponding to a perspective of the first device relative to the tag;
   determine a second perspective corresponding to a perspective of the second device relative to the tag;
   display the first and second avatars from the first perspective on the electronic device; and
   display the first and second avatars from the second perspective on the other electronic device.

9. The electronic device of claim 1, wherein the control circuitry is further operative to:

detect an interaction between the first virtual avatar and the second virtual avatar; and display the detected interaction on both electronic devices.

10. The electronic device of claim 9, wherein the control circuitry is further operative to:

direct the first virtual avatar as a game element of a multi-player game; and the first virtual avatar is opposed to the second virtual avatar in the context of the multi-player game.

* * * * *